United States Patent
Riazzi et al.

(10) Patent No.: US 11,021,613 B2
(45) Date of Patent: Jun. 1, 2021

(54) AQUEOUS POLYESTER DISPERSIONS, ARTICLES HAVING A COATING FORMED FROM SUCH AQUEOUS DISPERSIONS, AND METHODS OF COATING

(71) Applicant: SWIMC LLC, Cleveland, OH (US)

(72) Inventors: Arthur Riazzi, Harrison City, PA (US); Robert M. O'Brien, Monongahela, PA (US)

(73) Assignee: SWIMC LLC, Cleveland, OH (US)

( * ) Notice: Subject to any disclaimer, the term of this patent is extended or adjusted under 35 U.S.C. 154(b) by 21 days.

(21) Appl. No.: 16/470,473

(22) PCT Filed: Dec. 18, 2017

(86) PCT No.: PCT/US2017/067072
§ 371 (c)(1),
(2) Date: Jun. 17, 2019

(87) PCT Pub. No.: WO2018/118802
PCT Pub. Date: Jun. 28, 2018

(65) Prior Publication Data
US 2020/0010692 A1  Jan. 9, 2020

Related U.S. Application Data

(60) Provisional application No. 62/436,112, filed on Dec. 19, 2016.

(51) Int. Cl.
| | |
|---|---|
| *C09D 5/02* | (2006.01) |
| *C08G 63/183* | (2006.01) |
| *C08G 63/54* | (2006.01) |
| *C08J 3/03* | (2006.01) |
| *C08J 7/14* | (2006.01) |
| *C08J 7/16* | (2006.01) |
| *C09D 167/03* | (2006.01) |

(52) U.S. Cl.
CPC ............ *C09D 5/027* (2013.01); *C08G 63/183* (2013.01); *C08G 63/54* (2013.01); *C08J 3/03* (2013.01); *C08J 7/14* (2013.01); *C08J 7/16* (2013.01); *C09D 167/03* (2013.01); *C08G 2150/00* (2013.01); *C08G 2390/40* (2013.01)

(58) Field of Classification Search
USPC .................. 528/271, 272, 274; 428/480, 482
See application file for complete search history.

(56) References Cited

U.S. PATENT DOCUMENTS

| | | |
|---|---|---|
| 4,321,170 A | 3/1982 | Zabrocki et al. |
| 8,349,929 B2 | 1/2013 | Kainz et al. |
| 2014/0076768 A1 | 3/2014 | Cavellin et al. |

FOREIGN PATENT DOCUMENTS

| | | |
|---|---|---|
| CN | 102387924 A | 3/2012 |
| CN | 102712727 A | 10/2012 |
| CN | 103154163 A | 6/2013 |
| CN | 103502322 A | 1/2014 |
| CN | 103502354 A | 1/2014 |
| JP | 2005 154721 A | 6/2005 |
| WO | WO 2010/118356 A1 | 10/2010 |
| WO | WO 2011/009040 A1 | 1/2011 |
| WO | WO 2012/051540 A2 | 4/2012 |
| WO | WO 2012/118500 A1 | 9/2012 |
| WO | WO 2012/118501 A1 | 9/2012 |

OTHER PUBLICATIONS

U.S. Appl. No. 62/560,425, filed Sep. 19, 2017, Matthieu Andriot et al.
International Patent Application No. PCT/US2017/067072, filed Dec. 18, 2017; International Search Report / Written Opinion dated Apr. 9, 2018; 13 pages.
International Patent Application No. PCT/US2017/067072, filed Dec. 18, 2017; International Preliminary Report on Patentability dated Jul. 4, 2019; 8 pages.

*Primary Examiner* — Terressa Boykin
(74) *Attorney, Agent, or Firm* — Mueting Raasch Group

(57) ABSTRACT

An aqueous dispersion comprising: water; a hydrophobic aromatic polyester having a number average molecular weight of greater than 7,000 Daltons; and a water-dispersible aromatic polyester dispersant; wherein the hydrophobic aromatic polyester and the water-dispersible aromatic polyester dispersant form a stable aqueous dispersion; and wherein the hydrophobic aromatic polyester is present in the aqueous dispersion in an amount of less than 50 wt-%, based on the total weight of the hydrophobic aromatic polyester and the water-dispersible aromatic polyester dispersant.

20 Claims, No Drawings

AQUEOUS POLYESTER DISPERSIONS, ARTICLES HAVING A COATING FORMED FROM SUCH AQUEOUS DISPERSIONS, AND METHODS OF COATING

CROSS-REFERENCE TO RELATED APPLICATION

The present application is the § 371 U.S. National Stage of International Application Serial No. PCT/US2017/067072, filed Dec. 18, 2017, which claims priority to U.S. Provisional Application Ser. No. 62/436,112, filed on Dec. 19, 2016, the disclosures of which are incorporated herein by reference in their entireties.

BACKGROUND

Various coatings have been used as interior protective can coatings, including epoxy-based coatings and polyvinylchloride-based coatings. Each of these coating types, however, has potential shortcomings. For example, the recycling of materials containing polyvinyl chloride or related halogen-containing vinyl polymers can be problematic.

Also, many current packaging coatings contain mobile or bound bisphenol A (BPA), bisphenol F (BPF), bisphenol S (BPS), or aromatic glycidyl ether compounds thereof (e.g., the diglycidyl ether of BPA, BPF, or BPS compounds). Although the balance of scientific evidence available to date indicates that trace amounts of these compounds that might be released from existing coatings do not pose health risks to humans, these compounds are nevertheless perceived by some consumers as being potentially harmful to human health.

To address the aforementioned shortcomings, the packaging coatings industry has sought coatings based on alternative binder systems such as polyester resin systems. It has been problematic, however, to formulate polyester-based coatings that exhibit the required balance of coating characteristics (e.g., flexibility, adhesion, corrosion resistance, stability, resistance to crazing, etc.). For example, there has typically been a tradeoff between corrosion resistance and fabrication properties for such coatings. Also, water-based coatings are desirable from an environmental perspective.

SUMMARY OF THE DISCLOSURE

The present disclosure provides aqueous polyester dispersions, articles having a coating formed from such aqueous dispersions, and methods of coating.

In one embodiment, an aqueous dispersion is provided that includes: water; a hydrophobic aromatic polyester having a number average molecular weight of greater than 7,000 Daltons; and a water-dispersible aromatic polyester dispersant; wherein the hydrophobic aromatic polyester and the water-dispersible aromatic polyester dispersant form a stable aqueous dispersion; and wherein the hydrophobic aromatic polyester is present in the aqueous dispersion in an amount of less than 50 wt-%, based on the total weight of the hydrophobic aromatic polyester and the water-dispersible aromatic polyester dispersant.

In another embodiment, an article including one or more of a body portion or an end portion of a food or beverage can include a metal substrate; and a coating disposed on at least a portion of the metal substrate, the coating formed from an aqueous dispersion described herein.

In another embodiment, a method of making an aqueous dispersion is provided. The method includes: providing a hydrophobic aromatic polyester having a number average molecular weight of greater than 7,000 Daltons; providing a water-dispersible aromatic polyester dispersant; and mixing the hydrophobic aromatic polyester and the water-dispersible aromatic polyester in water under conditions effective to form a stable aqueous dispersion; wherein the conditions effective to form a stable aqueous dispersion comprises a temperature of 100° C. to 120° C. and atmospheric pressure.

In another embodiment, a method is provided that includes: providing an aqueous dispersion as described herein; and applying the aqueous dispersion to at least a portion of a metal substrate prior to or after forming the metal substrate into a food or beverage can or portion thereof.

The term "hydrophobic" as used herein in the context of an aromatic polyester means a polymer having an acid number of up to 5 mg KOH per gram resin, and that will not significantly dissolve in deionized water at 23° C. "Not significantly" means that the solubility in water of the material is less than 5 percent by weight (wt-%), preferably less than 1 wt-%, more preferably less than 0.5 wt-%, and even more preferably less than 0.1 wt-%, based on the total weight of the hydrophobic material and the water. For example, solubility can be determined by thoroughly mixing the polymer with water at 10 percent by weight (wt-%) at 23° C. for at least 24 hours (or at elevated temperature if that is necessary to dissolve the compound), allowing the mixture to sit at 23-25° C. for 24 hours, and observing the sample. In a glass jar with a 4-centimeter (4-cm) path length, if the material is insoluble the sample should have no evidence of a second phase that would be either liquid or solid or show separation on the top, bottom, or be distributed throughout the liquid phase of the sample.

The term "stable aqueous dispersion" refers to an aqueous dispersion that demonstrates no settling of the particles other than deposits of material that can be reincorporated with stirring. Such stability occurs immediately upon mixing the hydrophobic aromatic polyester and the water-dispersible aromatic polyester.

The term "particle size" refers to the average particle size as determined by the Milton Roy Spectronic 20D.

A "water-dispersible" polymer means a polymer that is capable of being combined by itself with water, without requiring the use of a secondary dispersing or emulsifying agent, to obtain an aqueous dispersion or emulsion of polymer particles having at least a one-month shelf stability at normal storage temperatures (e.g., room temperature and pressure).

The terms "polymer" and "polymeric material" include, but are not limited to, organic homopolymers, copolymers, such as for example, block, graft, random and alternating copolymers, terpolymers, etc., and blends and modifications thereof. Furthermore, unless otherwise specifically limited, the term "polymer" shall include all possible geometrical configurations of the material. These configurations include, but are not limited to, isotactic, syndiotactic, and atactic symmetries.

The term "substantially free" when used with respect to an aqueous dispersion that may contain a particular compound means that the referenced dispersion contains less than 100 parts per million (ppm) of the recited compound. The term "essentially free" when used with respect to an aqueous dispersion that may contain a particular compound means that the referenced dispersion contains less than 10 parts per million (ppm) of the recited compound. The term "essentially completely free" when used with respect to an aqueous dispersion that may contain a particular compound means that the referenced dispersion contains less than 5 parts per million (ppm) of the recited compound. The term "completely free" when used with respect to an aqueous dispersion, that may contain a particular compound means that the referenced dispersion contains less than 20 parts per billion (ppb) of the recited compound.

Herein, the term "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof).

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other claims are not useful, and is not intended to exclude other embodiments from the scope of the disclosure.

In this application, terms such as "a," "an," and "the" are not intended to refer to only a singular entity, but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

Also herein, all numbers are assumed to be modified by the term "about" and in certain embodiments, preferably, by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

As used herein, the term "room temperature" refers to a temperature of 20° C. to 25° C.

The term "in the range" or "within a range" (and similar statements) includes the endpoints of the stated range.

Reference throughout this specification to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout this specification are not necessarily referring to the same embodiment of the disclosure. Furthermore, the particular features, configurations, compositions, or characteristics may be combined in any suitable manner in one or more embodiments.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples may be used in various combinations. In each instance, the recited list serves only as a representative group and should not be interpreted as an exclusive list. Thus, the scope of the present disclosure should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Although various theories and possible mechanisms may have been discussed herein, in no event should such discussions serve to limit the claimable subject matter.

DETAILED DESCRIPTION OF ILLUSTRATIVE EMBODIMENTS

The present disclosure provides aqueous polyester dispersions, articles having a coating formed from such aqueous dispersions, and methods of coating.

In one embodiment, an aqueous dispersion is provided that includes: water; a hydrophobic aromatic polyester having a number average molecular weight of greater than 7,000 Daltons; and a water-dispersible aromatic polyester dispersant; wherein the hydrophobic aromatic polyester and the water-dispersible aromatic polyester dispersant form a stable aqueous dispersion; and further wherein at least one of the following is true:

the hydrophobic aromatic polyester is present in the aqueous dispersion in an amount of less than 50 wt-%, based on the total weight of the hydrophobic aromatic polyester and the water-dispersible aromatic polyester dispersant;

the aqueous dispersion includes particles having a particle size of up to 0.4 micron;

the aqueous dispersion has a pH of less than 8; or the water-dispersible aromatic polyester dispersant includes an end group and/or side group that includes at least one acid-containing group and at least one salt group.

The water-dispersible aromatic polyester dispersant and hydrophobic aromatic polyester are selected to form a stable aqueous dispersion upon mixing (preferably, immediately upon mixing) the hydrophobic aromatic polyester and the water-dispersible aromatic polyester dispersant in water. The mixing typically is carried out at a temperature above room temperature (e.g., 100° C. to 120° C.), but at atmospheric pressure.

In certain embodiments, the stability is maintained for at least 1 week, at least 1 month, at least 3 months, or at least 6 months under normal storage conditions (e.g., room temperature and atmospheric pressure) without agitation.

Significantly, the water-dispersible aromatic polyester dispersant and hydrophobic aromatic polyester can be mixed to form a stable aqueous dispersion without added steps (e.g., subjecting the mixture to elevated pressures). For example, they can be combined without melt blending to form a stable aqueous dispersion, in contrast to the compositions described in U.S. Pat. No. 8,349,929 (Kainz et al.).

In certain embodiments, aqueous dispersions of the present disclosure have a pH of less than 8. In certain embodiments, aqueous dispersions of the present disclosure have a pH of at least 5.

In certain embodiments, aqueous dispersions of the present disclosure include particles having a particle size of up to (i.e., no greater than) 0.4 micron. In certain embodiments, aqueous dispersions of the present disclosure include particles having a particle size of at least 0.1 micron. Typically, at least 90% of the particles are within a particle size of 0.1 to 0.4 micron.

In certain embodiments, the water-dispersible aromatic polyester dispersant and hydrophobic aromatic dispersant are selected to have compatible Hansen Solubility Parameters. Hansen Solubility Parameters provides a means of judging the compatibility of the hydrophobic aromatic polyester and the water-dispersible aromatic polyester dispersant, as described at http://www.hansen-solubility.com/HSP-science/basics.php.

Typically, in order for the hydrophobic aromatic polyester to be compatible with the water-dispersible aromatic polyester dispersant and produce a stable dispersion, the Dispersion Value (D) (as described in the Hansen Solubility Parameter Determination in the Examples Section) of the water-dispersible aromatic polyester dispersant should be no less than 17.7 and no greater than 20.2.

In certain embodiments, the aqueous dispersion includes the hydrophobic aromatic polyester in an amount of at least 10 wt-%, at least 15 wt-%, at least 20 wt-%, at least 25 wt-%, or at least 30 wt-%, based on the total weight of the hydrophobic aromatic polyester and the water-dispersible aromatic polyester dispersant. In certain embodiments, the aqueous dispersion includes the hydrophobic aromatic polyester in an amount of less than 50 wt-%, or up to 45 wt-%, or up to 40 wt-%, based on the total weight of the hydrophobic aromatic polyester and the water-dispersible aromatic polyester dispersant.

In certain embodiments, the aqueous dispersion includes the water-dispersible aromatic polyester dispersant in an amount of at least 50 wt-%, at least 55 wt-%, at least 60 wt-%, at least 65 wt-%, at least 70 wt-%, or at least 75 wt-%, based on the total weight of the hydrophobic aromatic polyester and the water-dispersible aromatic polyester dispersant. In certain embodiments, the aqueous dispersion includes the hydrophobic aromatic polyester in an amount of up to 90 wt-%, up to 85 wt-%, or up to 80 wt-%, based on the total weight of the hydrophobic aromatic polyester and the water-dispersible aromatic polyester dispersant.

In certain embodiments, the combination of the hydrophobic aromatic polyester and the water-dispersible aromatic polyester dispersant in water forms an aqueous dispersion that has a viscosity suitable for spray coating. In certain embodiments, the aqueous dispersion has a viscosity of 25 seconds to 70 seconds, when performed pursuant to ASTM D1200-88 using a Ford Viscosity Cup #2 at 25° C.

The combination of the hydrophobic aromatic polyester and the water-dispersible aromatic polyester dispersant in water forms an aqueous dispersion that can form a cured coating, preferably having a glass transition temperature (Tg) of at least 50° C., at least 60° C., or at least 70° C. Although the maximum Tg is not particularly restricted, in certain embodiments, the aqueous dispersion forms a cured coating having a Tg of up to 125° C., up to 110° C., or up to 100° C.

Significantly, in certain embodiments, aqueous dispersions of the present disclosure are substantially free of each of bisphenol A, bisphenol F, and bisphenol S, including epoxides thereof. In certain embodiments, aqueous dispersions of the present disclosure are essentially free of each of bisphenol A, bisphenol F, and bisphenol S, including epoxides thereof. In certain embodiments, aqueous dispersions of the present disclosure are essentially completely free of each of bisphenol A, bisphenol F, and bisphenol S, including epoxides thereof. In certain embodiments, aqueous dispersions of the present disclosure are completely free of each of bisphenol A, bisphenol F, and bisphenol S, including epoxides thereof.

Suitable hydrophobic aromatic polyesters used in the aqueous dispersions of the present disclosure have a number average molecular weight of greater than 7,000 Daltons.

In certain embodiments, the hydrophobic aromatic polyester has a number average molecular weight of greater than 10,000 Daltons. In certain embodiments, the hydrophobic aromatic polyester has a number average molecular weight of up to 20,000 Daltons.

The hydrophobic aromatic polyester may have any suitable Tg depending on the end use of the dispersion. In certain embodiments, the hydrophobic aromatic polyester has a Tg of at least 50° C., at least 60° C., or at least 70° C. Although the maximum Tg is not particularly restricted, in certain embodiments, the hydrophobic aromatic polyester has a Tg of up to 125° C., up to 110° C., or up to 100° C.

In certain embodiments, the hydrophobic aromatic polyester has at least 30 wt-% aromatic groups. That is, the hydrophobic aromatic polyester is derived from at least 30 wt-% aromatic monomers. In certain embodiments, the hydrophobic aromatic polyester has up to 80 wt-% aromatic groups. That is, the hydrophobic aromatic polyester is derived from up to 80 wt-% aromatic monomers.

In certain embodiments, the hydrophobic aromatic polyester has an acid number of at least 1 milligram (mg) KOH per gram resin. In certain embodiments, the hydrophobic aromatic polyester has an acid number of up to 5 mg KOH per gram resin.

In certain embodiments, the hydrophobic aromatic polyester has a hydroxyl number of at least 1 milligram (mg) KOH per gram resin. In certain embodiments, the hydrophobic aromatic polyester has a hydroxyl number of up to 10 mg KOH per gram resin.

Suitable hydrophobic aromatic polyesters include those available under the tradenames DYNAPOL L952 (a saturated linear aromatic polyester having a Tg of approximately 70° C., a molecular weight of 18,000 g/mol, an acid number of 2 mg KOH/g, and a hydroxyl number of 6 mg KOH/g), and DYNAPOL L912 (a saturated linear aromatic polyester having a Tg of approximately 105° C., a molecular weight of 15,000 g/mol, an acid number of less than 3 mg KOH/g, and a hydroxyl number approximately 5 mg KOH/g), both of which are available from Evonik Industries (Sanford, Me.).

Suitable water-dispersible aromatic polyester dispersants used in the aqueous dispersions of the present disclosure preferably form a stable aqueous dispersion with the hydrophobic aromatic polyesters described herein.

The water-dispersible polyester dispersant may be of any suitable molecular weight. In certain embodiments, the water-dispersible polyester dispersant has a number average molecular weight (Mn) of at least 2,000 Daltons, at least 4,000 Daltons, or at least 5,000 Daltons. While the upper molecular weight range is not restricted, the water-dispersible polyester dispersant will typically have an Mn of up to 50,000 Daltons, up to 20,000 Daltons, or up to 10,000 Daltons.

The water-dispersible polyester dispersant may have any suitable Tg, depending on the end use. In certain embodiments, the water-dispersible aromatic polyester has a Tg of at least 0° C., at least 10° C., at least 20° C., at least 30° C., at least 40° C., at least 50° C., at least 60° C., or at least 70° C. Although the maximum Tg is not particularly restricted, in certain embodiments, the water-dispersible aromatic polyester dispersant has a Tg of up to 125° C., up to 110° C., or up to 100° C.

In certain embodiments, the water-dispersible aromatic polyester dispersant includes at least 20 wt-% aromatic groups. That is, the water-dispersible aromatic polyester is derived from at least 20 wt-% aromatic monomers. In certain embodiments, the water-dispersible aromatic polyester dispersant includes up to 70 wt-% aromatic groups. That is, the water-dispersible aromatic polyester is derived from up to 70 wt-% aromatic monomers.

The water-dispersible aromatic polyester dispersant may include polymer backbone segments (e.g., monomer units) other than polyester segments. Typically, however, at least 50 wt-% of the polyester includes polyester segments. In some embodiments, substantially all (e.g., greater than 80 wt-%, greater than 90 wt-%, or greater than 95 wt-%, etc.), or all, of the water-dispersible aromatic polyester on a weight basis comprises polyester segments.

In certain embodiments, the water-dispersible aromatic polyester dispersant has an acid number of at least 5, at least 10, at least 15, at least 20, or at least 25, milligrams (mg) KOH per gram resin. In certain embodiments, the water-dispersible aromatic polyester dispersant has an acid number of up to 200, up to 100, up to 75, up to 50, or up to 40, mg KOH per gram resin. In certain embodiments, the water-dispersible aromatic polyester dispersant has an acid number of 14 to 32 mg KOH per gram resin.

In certain embodiments, the water-dispersible aromatic polyester dispersant includes an end group and/or side group that includes at least one salt group and at least one acid group. That is, in certain embodiments, suitable water-dispersible aromatic polyester dispersants include acid groups, a portion of which are neutralized to form salt groups. Typically, less than 100%, less than 95%, less than 90%, less than 85%, or less than 80% of the acid groups are neutralized to form salt groups.

The salt groups may be anionic or cationic salt groups (e.g., neutralized acid or base groups), or a combination thereof. Examples of anionic salt groups include neutralized acid or anhydride groups, sulphate groups (—OSO$_3^-$), phosphate groups (—OPO$_3^-$), sulfonate groups (—SO$_2$O$^-$), phosphinate groups (—POO$^-$), phosphonate groups (—PO$_3^-$), and combinations thereof. Examples of suitable cationic salt groups include:

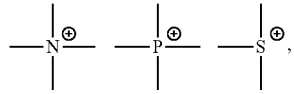

(referred to, respectively, as quaternary ammonium groups, quaternary phosphonium groups, and tertiary sulfate groups) and combinations thereof. Presently preferred salt groups include neutralized acid or anhydride groups and neutralized base groups, with neutralized carboxylic groups being preferred in certain embodiments.

Nonlimiting examples of neutralizing agents for forming anionic salt groups include inorganic and organic bases such as an amines, sodium hydroxide, potassium hydroxide, lithium hydroxide, ammonia, and mixtures thereof. In certain embodiments, fugitive bases are preferred (i.e., bases that predominanty volatilize off during coating cure). In certain embodiments, amines are preferred neutralizing agents. Nonlimiting examples of suitable amines include trimethyl amine, dimethylethanol amine (also known as dimethylamino ethanol), methyldiethanol amine, triethanol amine, ethyl methyl ethanol amine, dimethyl ethyl amine, dimethyl propyl amine, dimethyl 3-hydroxy-1-propyl amine, dimethylbenzyl amine, dimethyl 2-hydroxy-1-propyl amine, diethyl methyl amine, dimethyl 1-hydroxy-2-propyl amine, triethyl amine, tributyl amine, N-methyl morpholine, and mixtures thereof.

Examples of suitable neutralizing agents for forming cationic salt groups include organic and inorganic acids such as formic acid, acetic acid, hydrochloric acid, sulfuric acid, and combinations thereof.

In certain embodiments, the at least one salt group includes a neutralized acid or anhydride group, more typically a neutralized acid group, and even more typically an amine-neutralized acid group.

In certain embodiments, the water-dispersible aromatic polyester dispersant includes an end group that includes at least one salt group.

In such embodiments, the end groups preferably include the reaction product of a compound having at least one hydroxyl reactive group (e.g., anhydride group, isocyanate group) and at least one carboxylic acid group (e.g., 1, 2, 3, etc.) with the terminal OH groups of an aromatic polyester. In certain embodiments, the at least one hydroxyl reactive group in the compound having at least one hydroxyl reactive group and at least one carboxylic acid group is an anhydride group.

In certain embodiments of making water-dispersible aromatic polyester dispersants that include salt-containing end groups, the compound having at least one hydroxyl reactive group and at least one carboxylic acid group is a compound having one anhydride group and one or more carboxylic acid groups. In certain embodiments, the compound having at least one hydroxyl reactive group and at least one carboxylic acid group is a compound having one anhydride group and one carboxylic acid group. In certain embodiments, the compound having at least one hydroxyl reactive group and at least one carboxylic acid group is trimellitic anhydride (i.e., benzene 1-2-4-tricarboxylic acid).

In certain embodiments, the water-dispersible aromatic polyester dispersant includes a side group that includes at least one salt group. Water-dispersible aromatic polyester dispersants including a salt-containing side group are described, e.g., in U.S. Pat. Pub. No. 2014/0076768 A1(Cavellin et al.).

In such embodiments, the side groups include the reaction product of an unsaturated compound having at least one salt or salt-forming group that is attached to another portion of the polymer via reaction of the unsaturated compound with one or more double or triple bonds (in an unsaturated polyester precursor polymer), with the proviso that the reaction of the unsaturated compound with the one or more double or triple bonds does not require the participation of a free-radical initiator (such as is the case, e.g., in a Diels-Alder or Ene reaction mechanism).

In some embodiments, the salt-containing side group is attached to the backbone or another portion of the polymer (e.g., another portion attached to the backbone). In some embodiments, the salt-containing side group constitutes an entire pendant group attached directly to the backbone, whereas in other embodiments the side group constitutes a portion of a pendant group and the side group itself is not directly attached to the backbone. In preferred embodiments, the salt-containing side group is attached to another portion of the polymer via one or more carbon-carbon bonds, more typically one or more carbon-carbon single bonds.

In certain embodiments, the side group includes at least a portion of a cyclic group that links the side group to the backbone or another portion of the water-dispersible polymer that is attached to the backbone. That is, in some embodiments, the side group is attached to another portion of the water-dispersible aromatic polyester (e.g., a backbone of the polymer or another group attached to the backbone) via a cyclic group, which may optionally be a polycyclic group (e.g., a bridged bicyclic group such as a norbornene group). When a side group is attached via a Diels-Alder reaction mechanism, an unsaturated cyclic group is believed to result at the site of covalent attachment. The resulting unsaturated cyclic group may optionally be hydrogenated, if desired, to yield a saturated cyclic group.

In certain embodiments, the side group is a Diels Alder or Ene reaction product. That is, the unsaturated compound having one or more salt or salt-forming groups preferably includes at least one double bond capable of participating in a Diels-Alder reaction or an Ene reaction. Diels-Alder reactions (often referred to as [4+2] cycloadditions) typically involve the addition of an unsaturated component (often referred to as a "dienophile" in the context of a Diels-Alder reaction) across the 1,4 position of a conjugated diene component to form a cycloaddition reaction product that is typically cyclic or bicyclic in nature. In some situations, at least one of the conjugated diene and unsaturated components contains one or more substituents that "activate" the component toward reaction, although in some instances one or both components can contain a "deactivating" substituent or substituents. The Diels-Alder reaction is generally considered to be a concerted reaction, and as such, either component can be the "electron donor" or "electron acceptor" depending upon the substituents bonded thereto. By way of example, a schematic diagram of the reaction mechanism thought to occur during a Diels-Alder reaction between sorbic acid and an unsaturated structural unit derived from maleic anhydride is depicted below, including the resulting acid-containing side group (for formation of a salt-containing side group).

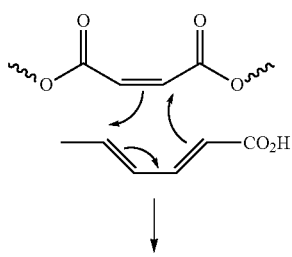

-continued

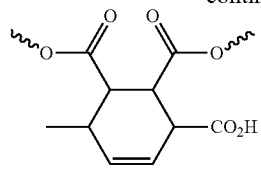

Thus, in some embodiments, the side group is attached to another portion of the functionalized polymer (e.g., a backbone of the polymer or another group attached to the backbone) via a cyclic group, which may optionally be a polycyclic group (e.g., a bridged bicyclic group such as a norbornene group). When a side group is attached via a Diels-Alder reaction mechanism, an unsaturated cyclic group is believed to result at the site of covalent attachment. The resulting unsaturated cyclic group may optionally be hydrogenated, if desired, to yield a saturated cyclic group.

In contrast, the reaction mechanism thought to occur if an Ene reaction occurs between sorbic acid and an unsaturated structural unit derived from maleic anhydride is depicted below, including the resulting acid-containing side group (for formation of the salt-containing side group).

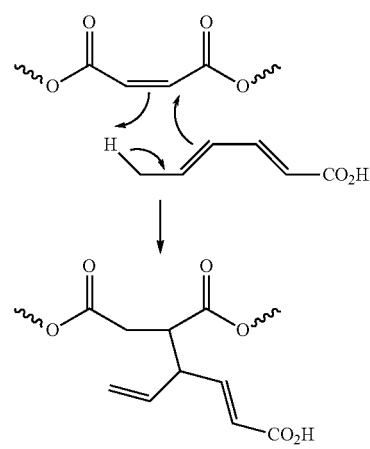

Unlike a Diels-Alder reaction mechanism, an Ene reaction mechanism does not require an unsaturated conjugated diene component. As such, when an Ene reaction mechanism is employed, a mono-unsaturated compound may be used (e.g., vinyl acetic acid) to incorporate a side group of the present disclosure. Ene reactions typically require that at least one allylic hydrogen is present, more preferable two allylic hydrogens attached to a same carbon atom. As depicted in the above reaction diagram, the covalently attached side group resulting from the Ene reaction is thought to include a double bond that includes a carbon atom to which an allylic hydrogen was attached prior to reaction.

In some embodiments, a Diels-Alder or Ene reaction mechanism may be used to covalently attach an unsaturated compound to an unsaturated pendant group of the unsaturated precursor polymer. In such embodiments, the resulting polymer includes at least one acid-containing side group (for formation of a salt-containing side group) that is not attached directly to a backbone of the polymer.

A Diels-Alder or Ene reaction may also be used to "endcap" one or more terminal ends of a backbone of the unsaturated precursor polymer with a structural unit derived from the unsaturated compound in order to provide one or more salt-containing groups.

While any suitable double or triple bonds may be included in the unsaturated precursor polymer, carbon-carbon double bonds and carbon-carbon triple bonds are preferred, with carbon-carbon double bonds being presently preferred. If desired, the double bonds may be conjugated double bonds, more preferably conjugated carbon-carbon double bonds.

The water-dispersible aromatic polyester can include any desired number of side group(s) derived from the unsaturated compound having one or more salt or salt-forming groups. In some embodiments, the water-dispersible polymer includes at least 0.5 wt-%, at least 1 wt-%, or at least 2 wt-% of such side groups. Although the maximum amount of such side groups is not restricted, the water-dispersible aromatic polyester will typically include side groups in an amount of less than 50 wt-%, less than 30 wt-%, or less than 7 wt-%. The above side group concentrations are based on the amount of unsaturated compound included in the reaction mixture relative to the total nonvolatile weight of reactants used to make the water-dispersible aromatic polyester.

In certain embodiments, the side group is formed from a single molecule of the unsaturated compound having a molecular weight of less than 200. That is, while the salt-group-containing or salt-forming-group-containing unsaturated compound can be of any suitable atomic weight, in presently preferred embodiments, it has an atomic weight of less than 200 (e.g., less than 200, less than 175, less than 150, less than 125, less than 100, etc.).

Examples of suitable unsaturated compounds having salt or salt-forming groups include sorbic acid (also referred to as 2,4-hexadienoic acid), 2,4-pentadienoic acid, furoic acid, 1-amino-1,3-butadiene, 1-naphthaleneacetic acid, anthracene carboxylic acid, 1,8-naphthalic anhydride, 1-naphthalene methylamine, vinyl acetic acid, neutralized variants thereof, and combinations thereof. Sorbic acid is a preferred unsaturated compound for use in forming the water-dispersible polymer.

In certain embodiments, water-dispersible aromatic polyester dispersants including a salt-group-containing side group are made from unsaturated polyester precursor polymers having one or more double or triple bonds. Although branched materials may be used, the unsaturated polymer is typically linear or substantially linear. While the one or more double or triple bonds of the unsaturated precursor polymer are typically located in a backbone of the polymer, the double or triple bonds may also be located in one or more pendant groups.

The unsaturated polyester precursor polymer may be prepared using standard condensation reactions. The polyester precursor is typically derived from a mixture of at least one polyfunctional alcohol ("polyol") esterified with at least one polycarboxylic acid (or derivative thereof). The reaction mixture preferably includes at least one unsaturated reactant. In some embodiments, a transesterification polymerization may be used. If desired, the unsaturated polyester precursor polymer may include polymer linkages (e.g., amide, carbamate, carbonate ester, ether, urea, urethane, etc.), side chains, and end groups not related to simple polyol and polyacid components.

Any suitable unsaturated reactants may be used to incorporate double and/or triple bonds into the unsaturated polyester precursor polymer. Such unsaturated reactants will typically include at least one reactive functional group capable of participating in a condensation and/or step-growth polymerization, and more typically will include two or more such reactive functional groups, with two such functional groups being preferred in some embodiments. Examples of such reactive functional groups include any of the active hydrogen groups disclosed herein, as well as any other suitable reactive functional groups such as, for example, isocyanate (—NCO) groups. Reactive functional groups capable of participating in ester-forming reactions (e.g., hydroxyl groups, carboxylic groups, anhydride groups, etc.) are examples of preferred such reactive functional groups. Unsaturated polyacids, (poly)anhydrides, or esterified variants thereof are examples of preferred unsaturated reactants, with unsaturated dicarboxylic acids and unsaturated mono-anhydrides being presently preferred. Some specific examples of suitable unsaturated reactants may include unsaturated carboxylic acids such as maleic acid, 2-methyl maleic acid, fumaric acid, itaconic acid, 2-methyl itaconic acid, nadic acid, methyl-nadic acid, tetrahydrophthalic acid, methyltetrahydrophthalic acid, derivatives or anhydrides thereof (e.g., maleic anhydride, nadic anhydride, and the like), and mixtures thereof. Some specific examples of suitable unsaturated polyols may include butane diol, butyne diol, 3-hexyne-2,5-diol, 2-butynedioic acid, and mixtures thereof.

Maleic anhydride is an example of a preferred compound for incorporating unsaturation into the unsaturated polyester precursor polymer. Maleic anhydride is particularly useful for a variety of reasons, including, for example, cost and ready availability in commercial quantities. Moreover, while not intending to be bound by any theory, it is believed that maleic anhydride is a particularly strong dienophile having excellent reactivity in a Diels-Alder reaction. Maleic anhydride is also a preferred reactant for Ene reactions. Thus, in certain embodiments, the side group is attached, via a carbon-carbon bond, to a structural unit derived from maleic anhydride. In certain embodiments, the structural unit derived from maleic anhydride is present in the backbone.

In some embodiments (e.g., where the coating composition is intended for use as a food-contact coating composition), it is preferable that the ratio of unsaturated compound to unsaturation in the polyester precursor polymer be controlled to avoid the presence of unsuitable amounts of residual unreacted unsaturated compound in the coating composition. For example, when the unsaturation of the polyester precursor is provided by maleic anhydride (or some other such unsaturated reactant(s)), the polyester precursor polymer preferably includes an excess, on a molar basis, of units derived from maleic anhydride (or other unsaturated reactants) relative to the amount of functional-group-containing unsaturated compound (e.g., sorbic acid) included in the reaction mixture. More preferably, the molar ratio of functional-group-containing unsaturated compound to unsaturated monomeric units present in the polyester precursor is less than 0.8:1, and even more preferably less than 0.6:1. In some embodiments, the molar ratio of functional-group-containing unsaturated compound to unsaturated monomeric units present in the polyester precursor is greater than 0.1:1, more preferably greater than 0.2:1, and even more preferably greater than 0.3:1. In some embodiments, the molar ratio of functional-group-containing unsaturated compound to carbon-carbon double bond containing monomeric units present in the polyester precursor is as described above.

Examples of suitable polycarboxylic acids for preparing the water-dispersible polyester polymer include dicarboxylic acids and polycarboxylic acids having higher acid functionality (e.g., tricarboxylic acids, tetracarboxylic acids, etc.) or anhydrides thereof, precursors or derivatives thereof (e.g., an esterifiable derivative of a polycarboxylic acid, such as a dimethyl ester or anhydride), or mixtures thereof.

Suitable polycarboxylic acids may include, for example, maleic acid, fumaric acid, succinic acid, adipic acid, phthalic acid, tetrahydrophthalic acid, methyltetrahydrophthalic acid, hexahydrophthalic acid, methylhexahydrophthalic acid, endomethylenetetrahydrophthalic acid, azelaic acid, sebacic acid, isophthalic acid, trimellitic acid, terephthalic acid, naphthalene dicarboxylic acid, cyclohexane dicarboxylic acid, glutaric acid, dimer fatty acids, anhydrides or derivatives thereof, and mixtures thereof. If desired, adducts of polyacid compounds (e.g., triacids, tetraacids, etc.) and monofunctional compounds may be used. It should be understood that in synthesizing the polyester, the specified acids may be in the form of anhydrides, esters (e.g., alkyl ester) or like equivalent form. For sake of brevity, such compounds are referred to herein as "carboxylic acids" or "polycarboxylic acids."

Examples of suitable polyols include diols, polyols having three or more hydroxyl groups (e.g., triols, tetraols, etc.), and combinations thereof. Suitable polyols may include, for example, 2-methyl-1,3-propanediol, tricyclodecanedimethanol, ethylene glycol, propylene glycol, 1,3-propanediol, glycerol, diethylene glycol, dipropylene glycol, triethylene glycol, trimethylolpropane, trimethylolethane, tripropylene glycol, neopentyl glycol, pentaerythritol, 1,4-butanediol, hexylene glycol, cyclohexanedimethanol, a polyethylene or polypropylene glycol, isopropylidene bis(p-phenylene-oxypropanol-2), cyclobutane diol (2,2,4,4-treteramethyl-1,3-cyclobutanediol), and mixtures thereof. If desired, adducts of polyol compounds (e.g., triols, tetraols, etc.) and monofunctional compounds may be used. In certain embodiments, cyclobutane diol (2,2,4,4-treteramethyl-1,3-cyclobutanediol) is preferred.

The reaction mixture used to form the water-dispersible polyester polymer may include any suitable optional comonomers.

If trifunctional or higher polyols or polycarboxylic acids are included in the reaction mixture used to make the unsaturated polyester precursor polymer, the total amount of such reactants are preferably stoichiometrically controlled to avoid gelling. In certain preferred embodiments, trifunctional or higher polyols and polycarboxylic acids are not included in the reaction mixture used to make the unsaturated polyester precursor polymer. If used, trifunctional monomer is preferably used in an amount of less than 5% by weight, based on the total nonvolatile weight of the reactants used to make the unsaturated polyester precursor polymer.

The water-dispersible polyester polymer includes one or more aromatic groups, more preferably one or more backbone aromatic groups. Suitable aromatic monomers that can be used to provide such aromaticity include, for example, acid-, ester-, or anhydride-functional aromatic monomers (e.g., aromatic monoacids and/or polyacids, more preferably aromatic polyacids); hydroxyl-functional aromatic monomers (e.g., aromatic mono- and/or poly-functional monomers); or aromatic monomers having one or more (typically at least two) reactive groups capable of participating in a condensation and/or step-growth reaction with a complimentary reactive group (more preferably, a hydroxyl, carboxylic acid, ester, or anhydride groups) to form a covalent linkage. Examples of suitable aromatic monomers include terephthalic acid, isophthalic acid, phthalic acid, phthalic anhydride, trimellitic anhydride, trimellitic acid, dimethyl terephthalate, dimethyl isophthalate, dimethyl phthalate, 5-sodiosulpho isophthalic acid, naphthalic acid, 1,8-naphthalic anhydride, dimethyl naphthalate, pyromellitic dianhydride, and derivatives and combinations thereof.

In some embodiments, one or both of the water-dispersible polyester dispersant and the hydrophobic aromatic polyester are furan-containing polyesters. For example, in some embodiments, one or both of the polyesters can include one or more furan-containing structural units incorporated, e.g., via a direct esterification reaction or a transesterification reaction involving one or more furan-containing compounds such as a furan dicarboxylic acid (e.g., 2,5-furandicarboxylic acid), an alkyl ester of a furan dicarboxylic acid (e.g a di(C1-C5)alkyl ester of 2,5-furandicarboxylic acid), or a furan-containing diol 2,5-bis(hydroxymethyl)furan or 3,4-bis(hydroxymethyl)furan)). In some such embodiments, the furan-containing polyesters are made without using terephthalic acid. Materials and methods relating to furan-containing polyesters are described in application U.S. Ser. No. 62/560,425, filed on Sep. 19, 2017, entitled "COATING COMPOSITIONS INCLUDING A FURAN-CONTAINING POLYESTER, ARTICLES, AND METHODS OF COATING."

Aqueous dispersions of the present disclosure may include a variety of optional additives, such as a lubricant, an inorganic pigment, a crosslinker, a catalyst, or a combination thereof.

In certain embodiments, an aqueous dispersion includes a crosslinker. In certain embodiments, an aqueous dispersion includes less than 0.1 wt-%, if any, of a crosslinker.

In certain embodiments, the crosslinker is selected from one or more of a phenoplast, an aminoplast, or a blocked isocyanate.

In certain embodiments, one or more carboxyl-reactive crosslinkers may be used. Beta-hydroxyalkylamides are preferred examples of carboxyl-reactive crosslinkers. Some examples of such compounds include: bis[N,N-di(β-hydroxy-ethyl)]adipamide, bis[N,N-di(β-hydroxy-propyl]succinamide, bis[N,N-di(β-hydroxy-ethyl)]azelamide, bis[N,N-di(β-hydroxy-propyl)]adipamide, bis[N-metil-N-β-hydroxy-ethyl)]oxamide, and mixtures thereof. Examples of commercially available beta-hydroxyalkylamides include the PRIMID QM-1260 and PRIMID XL-552 products available from EMS.

In certain embodiments, the aqueous dispersion may include a catalyst, such as an iron-containing catalyst to make the overall coating a thermoset coating.

In certain embodiments, the aqueous dispersion may include a surfactant; however, typically the aqueous dispersion contains less than 1,000 parts per million, less than 500 ppm, less than 100 ppm, less than 50 ppm, or 0 ppm, of non-polymeric surfactant (e.g., low-molecular weight surfactant having a molecular weight of less than 1,000 Daltons).

In certain embodiments, such as for certain spray coating applications (e.g., inside spray for food or beverage cans including, e.g., aluminum beverage cans), the aqueous dispersion includes polyester solids in an amount of at least 5 wt-%, at least 10 wt-%, or at least 15 wt-%, based on total weight of the aqueous dispersion. In certain embodiments, the aqueous dispersion includes polyester solids in an amount of up to 40 wt-%, up to 35 wt-%, up to 30 wt-%, or up to 25 wt-%, based on total weight of the aqueous dispersion. The liquid carrier (e.g., aqueous carrier) may constitute the remainder of the weight of the aqueous dispersion.

In certain embodiments, such as for certain spray coating applications (e.g., inside spray for food or beverage cans including, e.g., aluminum beverage cans), the aqueous dispersion includes polyester solids in an amount of 15 wt-% to 40 wt-%, and in some embodiments 18 wt-% to 25 wt-%, based on the total weight of the aqueous dispersion.

In certain embodiments, the aqueous carrier of the dispersions preferably includes water and may further include one or more optional organic solvents (e.g., one or more organic solvents such as cyclohexanone, carbitol, butyl carbitol, butylcellosolve, and butanol). In some embodiments, water constitutes greater than 20% by weight, more preferably greater than 35% by weight, and even more preferably greater than 50% by weight of the total weight of the aqueous carrier. In some embodiments, water constitutes 100% or less, less than 95% by weight, or less than 90% by weight of the total weight of the aqueous carrier.

While not intending to be bound by theory, the inclusion of a suitable amount of an organic solvent in the aqueous carrier can be advantageous in some embodiments. Accordingly, in certain embodiments, the one or more organic solvents may constitute greater than 0%, more preferably greater than 5%, and even more preferably greater than 10% by weight of the aqueous carrier. In these embodiments, the organic solvents may also constitute less than 80%, more preferably less than 65%, and even more preferably less than 50% or less than 40% by weight of the aqueous carrier.

The aqueous dispersions preferably have a viscosity suitable for a given coating application. Although various application methods are useable, the aqueous dispersions preferably have a viscosity suitable for spray coating.

In some embodiments, the aqueous dispersions (also referred to herein as coating compositions) may have an average viscosity of at least 20 seconds, at least 25 seconds, at least 30 seconds, at least 35 seconds, or at least 40 seconds, when performed pursuant to ASTM D1200-88 using a Ford Viscosity Cup #2 at 25° C. In some embodiments, the aqueous dispersions may also have an average viscosity up to 70 seconds, up to 50 seconds, up to 40 seconds, or up to 30 seconds, when performed pursuant to ASTM D1200-88 using a Ford Viscosity Cup #2 at 25° C.

Aqueous dispersions of the present disclosure include: providing a hydrophobic aromatic polyester having a number average molecular weight of greater than 7,000 Daltons; providing a water-dispersible aromatic polyester dispersant; and mixing the hydrophobic aromatic polyester and the water-dispersible aromatic polyester in water under conditions effective to form a stable aqueous dispersion; wherein the conditions effective to form a stable aqueous dispersion include a temperature of 100° C. to 120° C. and atmospheric pressure.

Use of aqueous dispersions of the present disclosure include: providing an aqueous dispersion as described herein; and applying the aqueous dispersion to at least a portion of a metal substrate prior to or after forming the metal substrate into a food or beverage can or portion thereof. In certain embodiments of such methods, the metal substrate includes a steel or aluminum substrate. In certain embodiments of such methods, the aqueous dispersion is applied to a preformed food or beverage can or a portion thereof. In certain embodiments of such methods, the aqueous dispersion is applied to a food- or beverage-contact surface of the metal substrate (i.e., an interior side of a food or beverage can or a surface that will become an interior side of a food or beverage can). In certain embodiments of such methods, the food or beverage can includes a two-piece drawn and ironed aluminum beverage can, and the aqueous dispersion is spray applied to form a continuous inside spray coating. In certain embodiments of such methods, applying the aqueous dispersion includes spraying the aqueous dispersion on the metal substrate in an amount sufficient to form a cured coating having an average dry film weight of 1 mg/in$^2$ (i.e., 1.55 g/m$^2$) to 20 mg/in$^2$ (i.e., 31 g/m$^2$).

The disclosed aqueous dispersions may be present as a layer of a mono-layer coating system or as one or more layers of a multi-layer coating system. The aqueous dispersions can be used as a primer coat, an intermediate coat, a top coat, or a combination thereof. The coating thickness of a particular layer and of the overall coating system will vary depending upon the coating material used, the substrate, the coating application method, and the end use for the coated article. Mono-layer or multi-layer coating systems including one or more layers formed from the disclosed aqueous dispersions may have any suitable overall coating thickness, and typically are applied, using the mixed units commonly employed in the packaging industry, at coating weights of 1 milligrams per square inch (mg/in$^2$ or msi) (i.e., 1.55 gram per square meter (g/m$^2$)) to 20 mg/in$^2$ (i.e., 31 g/m$^2$), and more typically at 1.5 mg/in$^2$ to 10 mg/in$^2$ (i.e., 2.3 g/m$^2$ to 15.5 g/m$^2$). That is, in certain embodiments, the cured coating has an average dry film weight of 1 mg/in$^2$ (i.e., 1.55 g/m$^2$) to 20 mg/in$^2$ (i.e., 31 g/m$^2$). Typically, the cured coating weight for rigid metal food or beverage can applications are 1 mg/in$^2$ (i.e., 1.55 g/m$^2$) to 6 mg/in$^2$ (i.e., 9.3 g/m$^2$). In certain embodiments in which an aqueous dispersion of the present disclosure is used as an interior coating on a drum (e.g., a drum for use with food or beverage products), the coating weight may be approximately 20 mg/in$^2$ (i.e., 31 g/m$^2$).

The metal substrate used in forming rigid food or beverage cans, or portions thereof, typically has a thickness in the range of 125 microns to 635 microns. Electro tinplated steel, cold-rolled steel, and aluminum are commonly used as metal substrates for food or beverage cans, or portions thereof. In embodiments in which a metal foil substrate is employed in forming, e.g., a packaging article, the thickness of the metal foil substrate may be even thinner that that described above.

The disclosed aqueous dispersions may be applied to a substrate either prior to, or after, the substrate is formed into an article such as, for example, a food or beverage container or a portion thereof. In one embodiment, a method of forming food or beverage cans is provided that includes: applying an aqueous dispersion described herein to a metal substrate (e.g., applying the composition to the metal substrate in the form of a planar coil or sheet), hardening the aqueous dispersion, and forming (e.g., via stamping) the substrate into a packaging container or a portion thereof (e.g., a food or beverage can or a portion thereof). For example, two-piece or three-piece cans or portions thereof such as riveted beverage can ends (e.g., soda or beer cans) with a cured coating of the disclosed aqueous dispersion on a surface thereof can be formed in such a method.

In another embodiment, a method of forming food or beverage cans is provided that includes: providing a packaging container or a portion thereof (e.g., a food or beverage can or a portion thereof), applying an aqueous dispersion described herein to the inside, outside, or both inside and outside portions of such packaging container or a portion thereof (e.g., via spray application, dipping, etc.), and hardening the composition.

As described above, the disclosed aqueous dispersions are particularly well adapted for use on food and beverage cans (e.g., two-piece cans, three-piece cans, etc.). Two-piece cans are manufactured by joining a can body (typically a drawn metal body) with a can end (typically a drawn metal end). The disclosed coatings are suitable for use in food or beverage contact situations and may be used on the inside of such cans (e.g., as a continuous inside spray coating, for example, on a food- or beverage-contact surface of a metal substrate). They are particularly suitable for being spray applied, liquid coatings for the interior side of an article (e.g., two-piece drawn and ironed aluminum beverage cans and coil coatings for beverage can ends). The disclosed aqueous dispersions also offer utility in other applications. These additional applications include, but are not limited to, wash coating, sheet coating, and side seam coatings (e.g., food can side seam coatings). The aqueous dispersions may also be useful in medical packaging applications, including, for example, on surfaces of metered-dose inhalers ("MDIs"), including on drug-contact surfaces.

Spray coating includes the introduction via spraying of the aqueous dispersion onto a surface, e.g., into the inside of a preformed packaging container. Typical preformed packaging containers suitable for spray coating include food cans, beer and beverage containers, and the like. The spray preferably utilizes a spray nozzle capable of uniformly coating the inside of the preformed packaging container. The sprayed preformed container is then subjected to heat to remove the carrier (i.e., water and any optional organic solvents) and harden the coating.

A coil coating is described as the coating of a continuous coil composed of a metal (e.g., steel or aluminum). Once coated, the coating coil is subjected to a short thermal, ultraviolet or electromagnetic curing cycle, for hardening (e.g., drying and curing) of the coating. Coil coatings provide coated metal (e.g., steel or aluminum) substrates that can be fabricated into formed articles, such as two-piece drawn food cans, three-piece food cans, food can ends, drawn and ironed cans, beverage can ends, and the like.

For any of the application techniques described above, the curing process may be performed in either discrete or combined steps. For example, substrates can be dried at ambient temperature to leave the aqueous dispersions in a largely uncrosslinked state. The coated substrates can then be heated to fully cure the compositions. In certain instances, the disclosed coating compositions may be dried and cured in one step. The cure conditions will vary depending upon the method of application and the intended end use. The curing process may be performed at any suitable temperature, including, for example, oven temperatures in the range of from 100° C. to 300° C., and more typically from 177° C. to 250° C. If the substrate to be coated is a metal coil, curing of the applied coating composition may be conducted, for example, by heating the coated metal substrate over a suitable time period to a peak metal temperature ("PMT") of preferably greater than 177° C. More preferably, the coated metal coil is heated for a suitable time period (e.g., 5 to 900 seconds) to a PMT of at least 218° C.

Other commercial coating application and curing methods are also envisioned, for example, electrocoating, extrusion coating, laminating, powder coating, and the like.

Preferred aqueous dispersions display one or more (and preferably all) of the following properties: metal exposure value of less than 10 milliAmps (mA), less than 5 mA, or less than 1 mA; metal exposure value after drop damage of less than 1.5 mA; global extraction results of less than 50 parts per million (ppm); adhesion rating of 10; and blush rating of at least 7.

Exemplary Embodiments

Embodiment 1 is an aqueous dispersion comprising: water; a hydrophobic aromatic polyester having a number average molecular weight of greater than 7,000 Daltons, or greater than 10,000 Daltons; and a water-dispersible aromatic polyester dispersant; wherein the hydrophobic aromatic polyester and the water-dispersible aromatic polyester dispersant form a stable aqueous dispersion; and further wherein at least one of the following is true:

the hydrophobic aromatic polyester is present in the aqueous dispersion in an amount of less than 50 wt-%, based on the total weight of the hydrophobic aromatic polyester and the water-dispersible aromatic polyester dispersant;

the aqueous dispersion comprises particles having a particle size of up to 0.4 micron;

the aqueous dispersion has a pH of less than 8; or the water-dispersible aromatic polyester dispersant comprises an end group and/or side group that includes at least one acid-containing group and at least one salt group.

Embodiment 2 is the aqueous dispersion of embodiment 1 comprising particles having a particle size of at least 0.1 micron.

Embodiment 3 is the aqueous dispersion of embodiment 1 or 2 comprising particles having a particle size of up to 0.4 micron.

Embodiment 4 is the aqueous dispersion of any preceding embodiment comprising the hydrophobic aromatic polyester in an amount of at least 10 wt-%, at least 15 wt-%, at least 20 wt-%, at least 25 wt-%, or at least 30 wt-%, based on the total weight of the hydrophobic aromatic polyester and the water-dispersible aromatic aromatic polyester dispersant.

Embodiment 5 is the aqueous dispersion of any preceding embodiment comprising the hydrophobic aromatic polyester in an amount of less than 50 wt-%, or up to 45 wt-%, or up to 40 wt-%, based on the total weight of the hydrophobic aromatic polyester and the water-dispersible aromatic polyester dispersant.

Embodiment 6 is the aqueous dispersion of any preceding embodiment comprising the water-dispersible aromatic polyester dispersant in an amount of at least 50 wt-%, at least 55 wt-%, at least 60 wt-%, at least 65 wt-%, at least 70 wt-%, or at least 75 wt-%, based on the total weight of the hydrophobic aromatic polyester and the water-dispersible aromatic polyester dispersant.

Embodiment 7 is the aqueous dispersion of any preceding embodiment comprising the water-dispersible aromatic polyester dispersant in an amount of up to 90 wt-%, up to 85 wt-%, or up to 80 wt-%, based on the total weight of the hydrophobic aromatic polyester and the water-dispersible aromatic polyester dispersant.

Embodiment 8 is the aqueous dispersion of any of the preceding embodiments comprising polyester solids in an amount of at least 5 wt-%, at least 10 wt-%, or at least 15 wt-%, based on the total weight of the aqueous dispersion.

Embodiment 9 is the aqueous dispersion of any of the preceding embodiments comprising polyester solids in an amount of up to 40 wt-%, up to 35 wt-%, up to 30 wt-%, or up to 25 wt-%, based on the total weight of the aqueous dispersion.

Embodiment 10 is the aqueous dispersion of any of the preceding embodiments comprising total solids in an amount of 15 wt-% to 40 wt-%, and in some embodiments 18 wt-% to 25 wt-% (e.g., certain inside spray embodiments), based on the total weight of the aqueous dispersion.

Embodiment 11 is the aqueous dispersion of any of the preceding embodiments having a viscosity suitable for spray coating.

Embodiment 12 is the aqueous dispersion of embodiment 11 which has a viscosity of 25 seconds to 70 seconds, when performed pursuant to ASTM D1200-88 using a Ford Viscosity Cup #2 at 25° C.

Embodiment 13 is the aqueous dispersion of any of the preceding embodiments which is stable for at least 1 week, at least 1 month, at least 3 months, or at least 6 months under normal storage conditions (e.g., room temperature and atmospheric pressure) without agitation.

Embodiment 14 is the aqueous dispersion of any of the preceding embodiments which forms a cured coating having a Tg of at least 50° C., at least 60° C., or at least 70° C.

Embodiment 15 is the aqueous dispersion of any of the preceding embodiments which forms a cured coating having a Tg of up to 125° C., up to 110° C., or up to 100° C.

Embodiment 16 is the aqueous dispersion of any of the preceding embodiments wherein the hydrophobic aromatic polyester has a number average molecular weight of up to 20,000 Daltons.

Embodiment 17 is the aqueous dispersion of any of the preceding embodiments wherein the hydrophobic aromatic polyester has a Tg of at least 50° C., at least 60° C., or at least 70° C.

Embodiment 18 is the aqueous dispersion of any of the preceding embodiments wherein the hydrophobic aromatic polyester has a Tg of up to 125° C., up to 110° C., or up to 100° C.

Embodiment 19 is the aqueous dispersion of any of the preceding embodiments wherein the hydrophobic aromatic polyester comprises at least 30 wt-% aromatic groups (or derived from at least 30 wt-% aromatic monomers).

Embodiment 20 is the aqueous dispersion of any of the preceding embodiments wherein the hydrophobic aromatic polyester comprises up to 80 wt-% aromatic groups (or derived from up to 80 wt-% aromatic monomers).

Embodiment 21 is the aqueous dispersion of any of the preceding embodiments wherein the water-dispersible aromatic polyester dispersant has a number average molecular weight of at least 2,000 Daltons, at least 4,000 Daltons, or at least 5,000 Daltons.

Embodiment 22 is the aqueous dispersion of any of the preceding embodiments wherein the water-dispersible aromatic polyester dispersant has a number average molecular weight of up to 50,000 Daltons, up to 20,000 Daltons, or up to 10,000 Daltons.

Embodiment 23 is the aqueous dispersion of any of the preceding embodiments wherein the water-dispersible aromatic polyester dispersant comprises at least 20 wt-% aromatic groups (or derived from at least 20 wt-% aromatic monomers).

Embodiment 24 is the aqueous dispersion of any of the preceding embodiments wherein the water-dispersible aromatic polyester dispersant comprises up to 70 wt-% aromatic groups (or derived from up to 70 wt-% aromatic monomers).

Embodiment 25 is the aqueous dispersion of any of the preceding embodiments wherein the water-dispersible aromatic polyester dispersant has an acid number of at least 5, at least 10, at least 15, at least 20, or at least 25, milligrams (mg) KOH per gram resin.

Embodiment 26 is the aqueous dispersion of any of the preceding embodiments wherein the water-dispersible aromatic polyester dispersant has an acid number of up to 200, up to 100, up to 75, up to 50, or up to 40, mg KOH per gram resin.

Embodiment 27 is the aqueous dispersion of any of the preceding embodiments wherein the water-dispersible aromatic polyester dispersant has a Tg of at least 0° C., at least 10° C., at least 20° C., at least 30° C., at least 40° C., at least 50° C., at least 60° C., or at least 70° C.

Embodiment 28 is the aqueous dispersion of any of the preceding embodiments wherein the water-dispersible aromatic polyester dispersant has a Tg of up to 125° C., up to 110° C., or up to 100° C.

Embodiment 29 is the aqueous dispersion of any of the preceding embodiments wherein the water-dispersible aromatic polyester dispersant comprises an end group and/or side group that includes at least one salt group.

Embodiment 30 is the aqueous dispersion of embodiment 29 wherein the at least one salt group comprises a neutralized acid or anhydride group, more typically a neutralized acid group, and even more typically an amine-neutralized acid group.

Embodiment 31 is the aqueous dispersion of embodiment 29 wherein the water-dispersible aromatic polyester dispersant comprises an end group that includes at least one salt group, wherein the end group comprises the reaction product of a compound having at least one hydroxyl reactive group (e.g., an anhydride group) and at least one carboxylic acid group (e.g., 1, 2, 3, etc.) with the terminal OH groups of an aromatic polyester.

Embodiment 32 is the aqueous dispersion of embodiment 31 wherein the end group comprises the reaction product of a compound having one anhydride group and one or more carboxylic acid groups with the terminal OH groups of an aromatic polyester.

Embodiment 33 is the aqueous dispersion of embodiment 31 wherein the end group comprises the reaction product of a compound having one anhydride group and one carboxylic acid group with the terminal OH groups of an aromatic polyester.

Embodiment 34 is the aqueous dispersion of embodiment 33 wherein the water-dispersible aromatic polyester dispersant end group comprises the reaction product of trimellitic anhydride (i.e., benzene 1-2-4-tricarboxylic acid) with the terminal OH groups of an aromatic polyester.

Embodiment 35 is the aqueous dispersion of embodiment 29 wherein the water-dispersible aromatic polyester dispersant comprises a side group that includes at least one salt group (e.g. a base-neutralized acid group such as, e.g., an amine-neutralized carboxylic group), wherein the side group comprises the reaction product of an unsaturated compound having at least one salt or salt-forming group that is attached to another portion of the polymer via reaction of the unsaturated compound with one or more double or triple bonds, with the proviso that the reaction of the unsaturated compound with the one or more double or triple bonds does not require the participation of a free-radical initiator (such as the case, e.g., in a Diels-Alder or Ene reaction mechanism).

Embodiment 36 is the aqueous dispersion of Embodiment 35 wherein the side group is a Diels Alder or Ene reaction product.

Embodiment 37 is the aqueous dispersion of embodiment 35 or 36 wherein the side group is attached directly to the polymer backbone.

Embodiment 38 is the aqueous dispersion of any one of embodiments 35 through 37 wherein the side group is attached to another portion of the polymer via a carbon-carbon bond.

Embodiment 39 is the aqueous dispersion of any of embodiments 35 through 38 wherein the side group includes at least a portion of a cyclic group that links the side group to the backbone or another portion of the water-dispersible polymer that is attached to the backbone.

Embodiment 40 is the aqueous dispersion of any of embodiments 35 through 39 wherein the unsaturated compound includes at least two conjugated carbon-carbon double bonds.

Embodiment 41 is the aqueous dispersion of any of embodiments 35 through 40 wherein the unsaturated compound comprises sorbic acid or neutralized sorbic acid.

Embodiment 42 is the aqueous dispersion of any of embodiments 35 through 41 wherein the side group is formed from a single molecule of the unsaturated compound having a molecular weight of less than 200.

Embodiment 43 is the aqueous dispersion of any of embodiments 35 through 42 wherein the side group is attached, via a carbon-carbon bond, to a structural unit derived from maleic anhydride.

Embodiment 44 is the aqueous dispersion of embodiment 43 wherein the structural unit derived from maleic anhydride is present in the backbone.

Embodiment 45 is the aqueous dispersion of any of the preceding embodiments wherein the aqueous dispersion contains less than 1,000 parts per million, if any, of non-polymeric surfactant (e.g., low-molecular weight surfactant having a molecular weight of less than 1,000 Daltons).

Embodiment 46 is the aqueous dispersion of any of the preceding embodiments wherein the aqueous dispersion is substantially free, or essentially free, or essentially completely free, or completely free, of each of bisphenol A, bisphenol F, and bisphenol S, including epoxides thereof.

Embodiment 47 is the aqueous dispersion of any of the preceding embodiments wherein the aqueous dispersion includes a lubricant, an inorganic pigment, crosslinker, catalyst, or combinations thereof.

Embodiment 48 is the aqueous dispersion of any of the preceding embodiments wherein the aqueous dispersion includes a crosslinker in an amount of less than 0.1 wt-%.

Embodiment 49 is the aqueous dispersion of any of the preceding embodiments wherein the water-dispersible aromatic polyester dispersant is prepared from cyclobutane diol (2,2,4,4-treteramethyl-1,3-cyclobutanediol).

Embodiment 50 is an article comprising: one or more of a body portion or an end portion of a food or beverage can comprising a metal substrate; and a coating disposed on at least a portion of the metal substrate, the coating formed from an aqueous dispersion of any preceding embodiment.

Embodiment 51 is the article of embodiment 50 wherein the article comprises a beverage can.

Embodiment 52 is the article of embodiment 51 wherein the article comprises a two-piece drawn and ironed aluminum beverage can.

Embodiment 53 is the article of any of embodiments 50 through 52 wherein the coating is located on an interior side of the article (i.e., a food- or beverage-contact surface of the metal substrate).

Embodiment 54 is the article of embodiment 53 wherein the coating is a continuous inside spray coating.

Embodiment 55 is the article of any of embodiments 50 through 54 wherein the food or beverage can contains a food or beverage product.

Embodiment 56 is a method of making an aqueous dispersion of any one of embodiments 1 through 49, the method comprising:

providing a hydrophobic aromatic polyester having a number average molecular weight of greater than 7,000 Daltons;

providing a water-dispersible aromatic polyester dispersant; and mixing the hydrophobic aromatic polyester and the water-dispersible aromatic polyester in water under conditions effective to form a stable aqueous dispersion;

wherein the conditions effective to form a stable aqueous dispersion comprises a temperature of 100° C. to 120° C. and atmospheric pressure.

Embodiment 57 is a method of using an aqueous dispersion, the method comprising: providing an aqueous dispersion of any of embodiments 1 through 49; and applying the aqueous dispersion to at least a portion of a metal substrate prior to or after forming the metal substrate into a food or beverage can or portion thereof.

Embodiment 58 is the method of embodiment 57 wherein the metal substrate comprises a steel or aluminum substrate.

Embodiment 59 is the method of embodiment 57 or 58 wherein the aqueous dispersion is applied to a preformed food or beverage can or a portion thereof.

Embodiment 60 is the method of any of embodiments 57 through 59 wherein the aqueous dispersion is applied to a food- or beverage-contact surface of the metal substrate (i.e., an interior side of a food or beverage can or a surface that will become an interior side of a food or beverage can).

Embodiment 61 is the method of embodiment 60 wherein the food or beverage can comprises a two-piece drawn and ironed aluminum beverage can, and the aqueous dispersion is spray applied to form a continuous inside spray coating.

Embodiment 62 is the method of any of embodiments 60 through 61 wherein applying the aqueous dispersion comprises spraying the aqueous dispersion on the metal substrate in an amount sufficient to form a cured coating having an average dry film weight of 1 mg/in$^2$ (i.e., 1.55 g/m$^2$) to 20 mg/in$^2$ (i.e., 31 g/m$^2$).

EXAMPLES

These Examples are merely for illustrative purposes and are not meant to be overly limiting on the scope of the appended claims. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

Unless otherwise noted, all parts, percentages, ratios, etc. in the examples and the rest of the specification are by weight, and all reagents used in the examples were obtained, or are available, from general chemical suppliers such as, for example, Sigma-Aldrich Company, Saint Louis, Mo., or may be synthesized by conventional methods.

These abbreviations are used in the following examples: ppm=parts per million; phr=parts per hundred rubber; mL=milliliter; L=liter; g=grams, min=minutes, h=hour, ° C.=degrees Celsius, MPa=megapascals, and N-m=Newton-meter, Mn=number average molecular weight, cP=centipoise.

Materials

| Designation | Description (including Source) |
|---|---|
| MP DIOL | 2-Methyl 1-3-Propane Diol - Sigma Aldrich |
| TCD Alcohol | TCD Alcohol DM ("tricyclodecane dimethanol" or octahydro-4,7-methano-1H-indenemethanol) - Oxea Corp. (Oberhausen, Germany) |
| Isophthalic Acid | Isophthalic Acid - Sigma Aldrich |
| Terephthalic Acid | Terephthalic Acid - Sigma Aldrich |
| Sebacic Acid | Decanedioc Acid - Sigma Aldrich |
| Tin Oxalate | Stannous Oxalate - Sigma Aldrich |
| Maleic Anhydride | 2-5 Furandione - Sigma Aldrich |
| Sorbic Acid | 2-4-Hexadienoic Acid - Sigma Aldrich |
| DYNAPOL L952 | DYNAPOL L952 (a hydrophobic saturated linear aromatic polyester; Tg = approx. 70° C.; Mol. Wt. = 18,000 g/mol; Acid No. = 2 mg KOH/g; Hydroxyl No. = 6 mg KOH/g) - Evonik Industries (Sandord, ME) |
| DYNAPOL L912 | DYNAPOL L912 (a hydrophobic saturated linear aromatic polyester; Tg = approx. 105° C.; Mol. Wt. = 15,000 g/mol; Acid No. = less than 3 mg KOH/g; Hydroxyl No. = approx. 5 mg KOH/g) - Evonik Industries (Sandord, ME) |
| Trimellitic anhydride | Benzene 1-2-4-Tricarboxylic Acid - Sigma Aldrich |
| EASTAR 6763 | Hydrophobic Aromatic Copolyester, Approx. Mol. Wt. = 26,000 Daltons - Eastman (Kingsport, TN) |

Test Methods
Particle Size Determination

This test method provides a procedure for a rapid and reproducible measurement of the average particle size of polymeric dispersions.
Equipment: Milton Roy Spectronic 20D (Spec 20).
Procedure:

A. Turn on the Spec 20 by rotating the Power Switch/Zero Control Knob clockwise. Adjust the Zero Control until a transmittance reading of 0.00, +/−0.02 max is obtained. Allow the instrument to warm up for at least fifteen minutes.

B. Rinse both a sample and a blank cuvette with distilled water.

C. Fill both cuvettes with distilled water. To the sample cuvette, add a couple drops of the material to be tested. Place your finger over the top of the cell and invert it a few times to adequately mix the sample into the distilled water. Hold the cuvette up to the light and make sure there is no concentrated spots of sample.

D. With the Wavelength Control Knob, located to the right of the sample compartment on the top of the instrument, set the wavelength to 375 millimicrons.

E. With the blank inside, adjust the transmittance to 100% with the right dial, which is the Transmittance/Absorbance Control Knob.

F. Remove the blank and insert the sample cuvette. Choose absorbance with the Mode Button. Read the absorbance reading for 375 mµ. This initial reading should be between 0.500 and 0.550. If the reading is too low, add more test sample. If the reading is too high, remove some of the sample from the cuvette and add more distilled water.

G. After a reading between 0.500 and 0.550 is obtained, remove the sample cuvette and return the Mode to Transmittance. Do not change or discard the sample. Set the wavelength to 450 mµ.

H. Adjust the transmittance to 100% with the right dial, remove the blank, use the Mode Button to select absorbance, insert the sample cuvette into the sample compartment, and take a reading.

I. Repeat this procedure until all wavelengths are tested. The required readings are at 375, 450, 500, and 550 mµ.

J. A particle size can then be determined by using the equation below.

$$[\text{Slope}] = \frac{\text{Log OD}(375) - \text{Log OD}(550)}{0.167}$$

Average Particle Size = Antilog $[0.055 - 0.2615[\text{Slope}]]$

Notes: All four points when plotted on a log scale should show linearity.
NV Determination Techniques to measure the solids content will be well known to a person skilled in the art. Suitably, the solids content may be determined by standard methods such as ASTM D4209-91.
Acid Number Determination Techniques to measure the acid number will be well known to a person skilled in the art. Suitably, the acid number may be determined by standard methods such as ASTM D974-14 with the following modifications: the dilution solvent is a blended mixture of dimethyl formamide and methyl ethyl ketone (MEK), and the indicator is a 90/10 blend of Thymol Blue/Cresol Red. The sample will be yellow prior to titration and the end point will be achieved when the sample turns blue.
Hydroxyl Delta Determination
Reagents:

A. Dimethylformamide (DMF); certified A.C.S. grade or equivalent.

B. Methylene chloride; HPLC grade or equivalent.

C. Tetrahydrofuran (THF); HPLC grade or equivalent.

D. Acetylating agent: Combine 44 g of acetic anhydride (97%) with 500 g of DMF and homogenize. Store in a dedicated airtight vessel labeled with the date prepared.

E. Catalyst solution: Dissolve 5 g of 4-(dimethylamino) pyridine (DMAP) in 500 mL of DMF. Store in a dedicated airtight vessel labeled with the date prepared.

F. Hydrolysis agent: Mix 4 parts by weight DMF with 1 part by weight deionized water. Store in a dedicated airtight vessel labeled with the date prepared.

G. 0.5N methanolic KOH standardized solution.

H. Phenolphthalein indicator: Mix 1 g of phenolphthalein with 100 g of absolute ethanol.
Procedure:

A. Accurately weigh resin sample into a clean Ehrlenmeyer flask.

B. Precisely add 15 mL of acetylating agent using a volumetric pipette, and stir sample for 15-20 minutes.

C. Carefully add 20 mL of hydrolysis agent, and stir for 15-20 minutes.

D. Add 25 mL of THF and stir to homogenize.

E. Add 8 drops of phenolphthalein indicator to the stirring sample.

F. Titrate the sample with standardized 0.5N KOH solution to a pink end point. Record the total volume in mL (A) required to titrate the sample.

G. Blank titrations must be run in triplicate the same day as the sample titrations. Follow Steps A-F for the blank runs (no resin sample), and the average (in mL) of the three titrations (B) is used in the Delta number calculation.
Calculations:

Use the following formula to calculate the hydroxyl number for each sample.

Delta=$((B-A)(0.5)(56.1))/(M)(\%NV)$ wherein:

A=volume of KOH in mL required to titrate sample

B=volume of KOH in mL required to titrate blanks (averaged)

M=mass of sample in grams

% NV=percent solids of sample (decimal)

Viscosity Measurement

Techniques to measure the viscosity will be well known to a person skilled in the art. Suitably, the viscosity may be determined by standard methods such as ASTM D2983-15, with samples run at 80° F. and equilibrated in a water bath. The sample cell may be an 8-ounce jar or other suitably sized container.

Tg Measurement

The Tg may be determined by Differential Scanning calorimetry (DSC) according to ASTM D6604-00(2013) ("Standard Practice for Glass Transition Temperatures of Hydrocarbon Resins by Differential Scanning calorimetry") using TA instruments Q100, standard aluminum sample pans, 20° C./min heating rate, indium calibration, reporting Tm, with the following exceptions: a 20° C./min cooling rate instead of quench cool, and a single, indium calibration point.

Mn Measurement The molecular weight distributions (Mn, Mw, Mz and <1000 Da) may be determined by Gel Permeation Chromatography (GPC) using a polystyrene standard according to ASTM D6579-11 ("Standard Practice for molecular weight averages and molecular weight distribution of hydrocarbon, rosin and terpene resins by size exclusion chromatography") using an RI detector, unstabilized THF, 10 mg/mL on solids sample concentration, 250 Da cutoff, with the following exceptions: no use of a retention time marker (5 epoxy controls run throughout sequence and compared to control chart), $3^{rd}$ order calibration curve.

pH Measurement

Equipment: pH meter—Beckman, Fisher Scientific, or equivalent.

Procedure:

A. The pH meter is standardized prior to use by employing standard buffer solutions. Standardization and pH measurement procedures are outlined in the manual for each instrument.

B. Adjust the sample to 25° C. (77° F.), immerse electrodes in the emulsion and take pH measurement.

C. Electrodes must be clean and dry before taking measurement.

D. Flush electrodes thoroughly with water immediately upon removing from the sample and wipe with a clean tissue.

Reporting Results: Report pH Readings to Nearest 0.05 pH Unit.

Hansen Solubility Parameter (HSP) Determination

An analysis was conducted on certain dispersants and hydrophobic polymers used in the present disclosure. The ranges and numbers below are in no way meant to limit or define the parameters for success or failure but rather are presented as a means to demonstrate the concept of compatibility between the water-dispersible aromatic polyester dispersant and the hydrophobic aromatic polyester.

Hansen Solubility Parameters provides a means of judging the compatibility of the hydrophobic aromatic polyester and the water-dispersible aromatic polyester dispersant, as described at http://www.hansen-solubility.com/HSP-science/basics.php.

The values determined include the following: D (dispersion value, a measure of hydrophobicity); P (polar value, a measure of polarity); H (hydrogen bonding value, a measure of hydrogen bonding); P+H (the higher the number, the more hydrophilic); and Ro (Measure of compatibility between solvent and polymer).

Of primary relevance to this analysis in Table 1 below is the Dispersion Value (D). In order for the hydrophobic aromatic polyester to be compatible with the water-dispersible aromatic polyester dispersant and produce a stable dispersion the D value of the water-dispersible aromatic polyester dispersant should be no less than 17.7 and no greater than 20.2. Examples that demonstrate this effect are the dispersant of Example 7 that is compatible with DYNAPOL L952 producing the stable dispersion, as demonstrated by Example 9. Dispersants with D values that differ too greatly from that of the hydrophobic aromatic polyester to be dispersed will fail to form a stable dispersion as is demonstrated by the dispersant of Example 13, which is incompatible with DYNAPOL L952 and fails to produce a stable dispersion, as demonstrated by Example 15.

TABLE 1

| | HSP Values | | | | | |
|---|---|---|---|---|---|---|
| Component | HSP Value D | HSP Value P | HSP Value H | HSP Value P + H | HSP Value Ro | Total HSP |
| DYNAPOL L-912 | 17.7 | 4.5 | 4.8 | 9.3 | 5.1 | 18.9 |
| Example 7 Aromatic Dispersant | 19.4 | 9.7 | 3.8 | 13.5 | 9.2 | 22.0 |
| DYNAPOL L-952 | 20.2 | 9.5 | 3.7 | 13.2 | 10.4 | 22.6 |
| Example 13 Aliphatic Dispersant | 21.5 | 8.8 | 9.4 | 18.2 | 12.5 | 25.1 |

EXAMPLES

Preparative Example 1

Preparation of Aromatic Polyester Dispersant

A round-bottomed 3-liter flask fitted with a glycol column to remove the water of reaction was charged with the following: 458.3 g MP DIOL; 88.8 g cyclohexanedimethanol—90%; 6.0 g trimethylol propane; 166.1 g isophthalic acid; 495.2 g terephthalic acid; 109.1 g sebacic acid; and 1.3 g tin oxalate as catalyst. The flask was fitted with a thermocouple, heating mantle, and $N_2$ flow. Under agitation, the mixture was heated to 240° C. while removing water during the heat up. The completion of this stage was monitored via acid number and considered complete when an acid number of 5.0 or less was achieved. Once the acid number was achieved, the batch was cooled to 170° C. and the column was replaced with a burrets trap filled with xylene. Xylene was added to the batch to reduce the solids to 94%, and 104.1 g of maleic anhydride was then added to the batch. The batch was reheated to 200° C. while removing water and monitoring acid number and hydroxyl delta. The delta target was maintained at 11.0 with the addition of MP DIOL as necessary. The reaction was continued until an acid number of 10.0 was determined. Once the acid number was achieved, the batch temperature was reduced to 160° C. and 49.1 g of sorbic acid was added. The batch was held for 8 hours at 160° C. At the conclusion of the 8-hour hold, the batch was reduced to 64.5% solids with a mixture of cyclohexanone, carbitol, butyl carbitol, butylcellosolve, and butanol in a ratio of 17.5:52.5:10:10:10, respectively. The material produced had an Mn of 5460, and a solids of 64.5%.

Example 2

Evaluation of Water Dispersibility of Polyester Dispersant of Example 1

A sample of 294.2 g of material from Example 1 was charged to a 2-liter round-bottomed flask, fitted with a thermocouple and a condenser, and heated to 78° C. When the temperature was reached, 3.4 g of dimethylethanolamine was added over 5 minutes. Once the addition was complete, 202.4 g of water was added over a period of 60 minutes. Thirty minutes into the water addition, the heat was turned off, and the temperature allowed to drop. At the conclusion of the water addition, the batch was cooled to room temperature to produce a stable dispersion with the following properties: NV=39.5%; pH=7.0; acid number=24.8; particle size=0.11 micron; and viscosity=462 cP.

Example 3

Preparation of Aqueous Dispersion with Polyester Dispersant of Example 1

A sample of 176.4 g of material from Example 1 was charged to a 2-liter round-bottomed flask fitted with a thermocouple and a condenser. The following were added under agitation: 7.3 g cyclohexanone; 22 g carbitol; 4.2 g butyl carbitol; 4.2 g butyl cellosolve; and 4.2 g butanol. The mixture was then heated under a $N_2$ blanket to 85° C. When the temperature was reached, 113.8 g of DYNAPOL L952 was added over a 10-minute period. The mixture was held at temperature for about 90 minutes until the DYNAPOL L952 was dissolved. The loading of DYNAPOL L952 on the polyester dispersant of Example 1 was at 50% solids on solids. Once the DYNAPOL L952 was dissolved, and the mixture was cooled to 78° C. While at this temperature, 3.4 g of dimethylethanolamine was added over 5 minutes. Once this addition was complete, 140.5 g of water was added over a period of 60 minutes. Thirty minutes into the water addition, the heat was turned off and the temperature allowed to drop. At the conclusion of the water addition, the batch was cooled to room temperature to produce a stable dispersion with the following properties: NV=48.6%; pH=7.3; acid number=14.1; particle size=0.34 micron; and viscosity=725 cP.

Preparative Example 4

Preparation of Aromatic Polyester Dispersant

A round-bottomed 3-liter flask fitted with a glycol column to remove the water of reaction was charged with the following: 662.0 g TCD Alcohol; 12.2 g MP DIOL; 61.8 g cyclohexanedimethanol—90%; 4.2 g trimethylol propane; 115.6 g isophthalic acid; 172.4 g terephthalic acid; 75.9 g sebacic acid; and 1.3 g tin oxalate as catalyst. The flask was fitted with a thermocouple, heating mantle, and $N_2$ flow. Under agitation, the mixture was heated to 240° C. while removing water during the heat up. The completion of this stage was monitored via acid number and considered complete when an acid number of 5.0 or less was achieved. Once the acid number was achieved, the batch was cooled to 170° C. and the column was replaced with a burrets trap filled with xylene. Xylene was added to the batch to reduce the solids to 94%, and then 72.5 g of maleic anhydride and 172.4 g nadic anhydride was added to the batch. The batch was reheated to 190° C. while removing water and monitoring acid number and hydroxyl delta. The delta target was maintained at 16.0 with the addition of MP DIOL as necessary. The reaction continued until an acid number of 17.0 was determined. Once the acid number was achieved, the batch temperature was reduced to 160° C. and then 49.1 g of sorbic acid was added. The batch was held for 8 hours at 160° C. At the conclusion of the 8-hour hold, the batch was reduced to 59.6% solids with a mixture of cyclohexanone, carbitol, butyl carbitol, butyl cellosolve, and butanol in a ratio of 13.8:41.8:8.0:28.4:8.0, respectively. The material produced had an Mn of 3820, and a solids of 59.6%.

Example 5

Evaluation of Water Dispersibility of Polyester Dispersant of Example 4

A sample of 209.6 g of material from Example 4 was charged to a 2-liter round-bottomed flask fitted with thermocouple and condenser. Also charged to the flask under agitation was 8.4 g butyl cellosolve. The mixture was then heated under $N_2$ blanket to 85° C. When the temperature was reached, 12.5 g of DYNAPOL L952 was then added, and the mixture was held at temperature for about 150 minutes until the DYNAPOL L952 was dissolved. Once dissolved, the mixture was cooled to 78° C. and 3.5 g of dimethylethanolamine was added over 5 minutes. Once the addition was complete, 239.9 g of water was added over a period of 60 minutes. Thirty minutes into the water addition, the heat was turned off, and the temperature allowed to drop. At the conclusion of the water addition, the batch was cooled to room temperature to produce a stable dispersion with the following properties: NV=29.0%; pH=7.4; acid number=27.2; and particle size=0.19 micron. The loading of DYNAPOL L952 on the polymeric dispersant of Example 4 was at 10% solids on solids.

Comparative Example 6

Preparation of Aqueous Dispersion with Polyester Dispersant of Example 4

A sample of 40.4 g butyl cellosolve was charged to a 1-liter round-bottomed flask fitted with thermocouple and condenser, and heated under a $N_2$ blanket to 150° C. While at this temperature, 10.4 g of EASTAR 6763 was then added, and the mixture was held at temperature for about 70 minutes until the EASTAR 6763 was dissolved. Once dissolved, the mixture was allowed to cool to 98° C. during the addition of 175.0 g of the material from Example 4. At the end of the addition, the batch was at 98° C. and 4.1 g of dimethylethanolamine was added over 5 minutes. Once addition was complete, 238.7 g of water was added over a period of 60 minutes. The temperature set point was reset to 78° C. and the batch allowed to cool during the water addition. Thirty minutes into the water addition, with the batch temperature at 78° C., the heat was turned off and the temperature allowed to drop. At the conclusion of the water addition, the batch was cooled to room temperature to produce a dispersion with the following properties: NV=24.0%; and a particle size=0.19 micron. The loading of EASTAR 6763 on the polymeric dispersant of Example 4 was at 10% solids on solids. The dispersion was not stable and separated within 24 hours. It is believed that this instability is due to the hydrophobic aromatic polyester of this example being too high a molecular weight; however, it is believed that a dispersant could be selected that is more compatible with this high molecular weight hydrophobic aromatic polyester and form a stable dispersion.

Preparative Example 7

Preparation of Aromatic Polyester Dispersant

A round-bottomed 2-liter flask fitted with a glycol column to remove the water of reaction was charged with the following: 314.1 g MP DIOL, 60.9 g cyclohexanedimethanol—90%; 4.1 g trimethylol propane; 113.9 g isophthalic acid; 339.4 g terephthalic acid; 74.8 g sebacic acid; and 0.9 g tin oxalate as catalyst. The flask was fitted with a thermocouple, heating mantle, and $N_2$ flow. Under agitation, the mixture was heated to 240° C. while removing water during the heat up. The completion of this stage was monitored via acid number and considered complete when an acid number of 5.0 or less was achieved. Once the acid number was achieved, the batch was cooled to 170° C., and the column was replaced with a burrets trap filled with xylene. Xylene was added to the batch to reduce the solids to 94% and 71.4 g of maleic anhydride was then added to the batch. The batch was reheated to 200° C. while removing water and monitoring acid number and hydroxyl delta. The delta target was maintained at 11.0 with the addition of MP DIOL as necessary. The reaction was continued until an acid number of 11.9 was determined. Once the acid number was achieved, the batch temperature was reduced to 170° C. with the addition of 75.9 g of cyclohexanone, and then 32.0 g of trimellitic anhydride was added. The batch was held for 2 hours at 170° C. At the conclusion of the 2-hour hold, the batch was reduced to 64.5% solids with a mixture of carbitol, butyl carbitol, butyl cellosolve, and butanol in a ratio of 64:12:12:12, respectively. The material produced had an Mn of 3620, and a solids of 65.6%.

Example 8

Evaluation of Water Dispersibility of Polyester Dispersant of Example 7

A sample of 215.5 g of material from Example 7 was charged to a 2-liter round-bottomed flask fitted with thermocouple and condenser. Also charged to the flask under agitation was 17.6 g butyl cellosolve. The mixture was heated to 78° C. and 5.7 g of dimethylethanolamine was added over 5 minutes. Once the addition was complete, 248.7 g of water was added over a period of 60 minutes. Thirty minutes into the water addition, the heat was turned off and the temperature allowed to drop. At the conclusion of the water addition, the batch was cooled to room temperature to produce a stable dispersion with the following properties: NV=29.0%; pH=6.2; acid number=32.6; particle size=0.08 micron; and viscosity=20 cP.

Example 9

Preparation of Aqueous Dispersion with Polyester Dispersant of Example 7

A sample of 178.6 g of material from Example 7 was charged to a 2-liter round-bottomed flask fitted with thermocouple and condenser. The flask was also charged under agitation with the following: 7.4 g cyclohexanone; 22 g carbitol; 4.2 g butyl carbitol; 4.2 g butyl cellosolve; and 4.2 g butanol. The mixture was then heated under a $N_2$ blanket to 85° C. While at this temperature, 117.2 g of DYNAPOL L952 was added over a 30-minute period. The mixture was held at temperature for about 65 minutes until the DYNAPOL L952 was dissolved. Once dissolved, the mixture was cooled to 78° C. and 4.5 g of dimethylethanolamine was added over 5 minutes. Once the addition was complete, 145.5 g of water was added over a period of 60 minutes. Thirty minutes into the water addition, the heat was turned off and the temperature allowed to drop. At the conclusion of the water addition, the batch was cooled to room temperature to produce a stable dispersion with the following properties: NV=47.5%; pH=6.2; acid number=17.6; particle size=0.34 micron; and viscosity=108 cP. The loading of DYNAPOL L952 on the polymeric dispersant of Example 4 was at 50% solids on solids.

Preparative Example 10

Preparation of Aromatic Polyester Dispersant

A round-bottomed 2-liter flask fitted with a glycol column to remove the water of reaction was charged with the following: 309.4 g MP DIOL, 60.7 g cyclohexanedimethanol—90%; 4.1 g trimethylol propane; 39.0 g isophthalic acid; 338.3.4 g terephthalic acid; 74.5 g sebacic acid, and 0.9 g tin oxalate as catalyst. The flask was fitted with a thermocouple, heating mantle, and $N_2$ flow. Under agitation, the mixture was heated to 235° C. while removing water during the heat up. The completion of this stage was monitored via acid number and considered complete when an acid number of 5.0 or less was achieved. Once the acid number was achieved, the batch was cooled to 170° C. and the column was replaced with a burrets trap filled with xylene. Xylene was added to the batch to reduce the solids to 94% and 71.1 g of maleic anhydride and 75.4 g of isophthalic acid was then added to the batch. The batch was reheated to 200° C. while removing water and monitoring acid number and hydroxyl delta. The delta target was maintained at 5.5 with the addition of MP DIOL as necessary. The reaction was continued until an acid number of 32.0 was determined. Once the acid number was achieved, the batch was reduced to 64.5% solids with a mixture of cyclohexanone, carbitol, butyl carbitol, butyl cellosolve, and butanol in a ratio of 17.5:52.5:10:10:10, respectively. The material produced had an Mn of 2980, and a solids of 66.6%.

Example 11

Evaluation of Water Dispersibility of Polyester Dispersant of Example 10

A sample of 178.6 g of material from Example 10 was charged to a 1 liter round-bottomed flask fitted with thermocouple and condenser. Under agitation, the mixture was heated to 78° C. and 3.6 g of dimethylethanolamine was added over 5 minutes. Once the addition was complete, 224.9 g of water was added over a period of 60 minutes. Thirty minutes into the water addition, the heat was turned off and the temperature allowed to drop. At the conclusion of the water addition, the batch was cooled to room temperature to produce a stable dispersion with the following properties: NV=29.0%; pH=7.3; acid number=25.7; and particle size=0.21 micron.

Comparative Example 12

Preparation of Aqueous Dispersion with Polyester Dispersant of Example 10

A sample of 178.6 g of material from Example 10 was charged to a 2-liter round-bottomed flask fitted with thermocouple and condenser. Also charged to the flask under agitation were the following: 7.4 g cyclohexanone; 22 g carbitol; 4.2 g butyl carbitol; 4.2 g butyl cellosolve; and 4.2 g butanol. The mixture was then heated under a $N_2$ blanket to 85° C. While at this temperature, 117.2 g of DYNAPOL L952 was added over a 30-minute period. The mixture was held at temperature for about 120 minutes until the DYNAPOL L952 was dissolved. Once dissolved, the mixture was cooled to 78° C. and 3.6 g of dimethylethanolamine was added over 5 minutes. Once the addition was complete, 150.2 g of water was added over a period of 60 minutes. Thirty minutes into the water addition, the heat was turned off and the temperature allowed to drop. At the conclusion of the water addition, the batch was cooled to room temperature. The material was very high in particle size and a stable dispersion was not achieved.

Preparative Example 13

Preparation of Aliphatic Polyester Dispersant

A round-bottomed 2-liter flask fitted with a glycol column to remove the water of reaction was charged with the following: 339.6 g MP DIOL, 48.5 g 1-6 hexanediol, 80.9 g sebacic acid, 431.0 g adipic acid, 4.5 g trimethylol propane, and 0.9 g tin oxalate as catalyst. The flask was fitted with a thermocouple, heating mantle, and $N_2$ flow. Under agitation, the mixture was heated to 220° C. while removing water during the heat up. The completion of this stage was monitored via acid number and considered complete when an acid number of 5.0 or less was achieved. Once the acid number was achieved, the batch was cooled to 170° C., and the column was replaced with a burrets trap filled with xylene. Xylene was added to the batch to reduce the solids to 94%, and 77.1 g of maleic anhydride was then added to the batch. The batch was reheated to 195° C. while removing water and monitoring acid number and hydroxyl delta. The delta target was maintained at 12.0 with the addition of MP DIOL as necessary. The reaction was continued until an acid number of 12.0 was determined. Once the acid number was achieved, the batch temperature was reduced to 160° C., and then 33.6 g of sorbic acid was added. The batch was held for 8 hours at 160° C. At the conclusion of the 8-hour hold, the batch was reduced to 64.4% solids with a mixture of cyclohexanone, carbitol, butyl carbitol, butyl cellosolve, and butanol in a ratio of 17.5:52.5:10:10:10, respectively. The material produced had an Mn of 5290, and a solids of 66.0%.

Example 14

Evaluation of Water Dispersibility of Polyester Dispersant of Example 13

A sample of 178.6 g of material from Example 13 was charged to a 1-liter round-bottomed flask fitted with thermocouple and condenser. Under agitation, the mixture was heated to 78° C. and 3.1 g of dimethylethanolamine was added over 5 minutes. Once the addition was complete, 224.8 g of water was added over a period of 60 minutes. Thirty minutes into the water addition, the heat was turned off and the temperature allowed to drop. At the conclusion of the water addition, the batch was cooled to room temperature to produce a stable dispersion with the following properties: NV=29.0%; pH=8.1; acid number=21.3; and particle size=0.09 micron.

Comparative Example 15

Preparation of Aqueous Dispersion with Polyester Dispersant of Example 13

A sample of 178.6 g of material from Example 13 was charged to a 2-liter round-bottomed flask fitted with thermocouple and condenser. Also charged to the flask under agitation were the following: 7.4 g cyclohexanone; 22 g carbitol; 4.2 g butyl carbitol; 4.2 g butyl cellosolve; and 4.2 g butanol. The mixture was then heated under a $N_2$ blanket to 95° C. While at temperature, 117.8 g of DYNAPOL L952 was added over a 20-minute period. The mixture was held at temperature for about 60 minutes but the DYNAPOL L952 did not dissolve. So, the temperature was raised to 106° C. and held for an additional 2.5 hours until the DYNAPOL L952 was dissolved. Once dissolved, the mixture was cooled to 78° C. and 3.1 g of dimethylethanolamine was added over 5 minutes. Once the addition was complete, 149.5 g of deionized water was added over a period of 60 minutes. Thirty minutes into the water addition, the heat was turned off and the temperature allowed to drop. At the conclusion of the water addition, the batch was very thick so an additional 295 g of dionized water was added to reduce the solids to 30%. Upon completion of the water addition, the batch was cooled to room temperature. A stable dispersion could not be achieved, and the batch separated once agitation was stopped.

Preparative Example 16

Preparation of Aliphatic Polyester Dispersant

A round-bottomed 2-liter flask fitted with a glycol column to remove the water of reaction was charged with the following: 341.0 g MP DIOL; 48.9 g 1-6 hexanediol; 4.4 g trimethylol propane; 80.7 g sebacic acid; 429.9 g adipic acid; and 0.9 g tin oxalate as catalyst. The flask was fitted with a thermocouple, heating mantle, and $N_2$ flow. Under agitation, the mixture was heated to 220° C. while removing water during the heat up. The completion of this stage was monitored via acid number and considered complete when an acid number of 5.0 or less was achieved. Once the acid number was achieved, the batch was cooled to 170° C. and the column was replaced with a burrets trap filled with xylene. Xylene was added to the batch to reduce the solids to 94% and 76.9 g of maleic anhydride was then added to the batch. The batch was reheated to 170° C. while removing water and monitoring acid number and hydroxyl delta. The delta target was maintained at 15.2 with the addition of MP DIOL as necessary. The reaction was continued until an acid number of 13.0 was determined. Once the acid number was achieved, 32.0 g trimellitic anhydride was added to the batch. The batch was held for two hours at 170° C. At the end of the two-hour hold, the batch was reduced to 64.4% solids with a mixture of cyclohexanone, carbitol, butyl carbitol, butyl cellosolve, and butanol in a ratio of 17.5:52.5:10:10:10, respectively. The material produced had an Mn of 3620, and a solids of 65.4%.

Example 17

Evaluation of Water Dispersibility of Polyester Dispersant of Example 16

A sample of 173.0 g of material from Example 16 was charged to a 1-liter round-bottomed flask fitted with thermocouple and condenser. Under agitation, the mixture was heated to 78° C. and 4.1 g of dimethylethanolamine was added over 5 minutes. Once the addition was complete, 213.0 g of water was added over a period of 60 minutes. Thirty minutes into the water addition, the heat was turned off and the temperature allowed to drop. At the conclusion of the water addition, the batch was cooled to room temperature to produce a stable dispersion with the following properties: NV=29.0%; pH=6.5; acid number=32.0; particle size=0.09 micron.

Comparative Example 18

Preparation of Aqueous Dispersion with Polyester Dispersant of Example 16

A sample of 178.6 g of material from Example 16 was charged to a 2-liter round-bottomed flask fitted with thermocouple and condenser. Also charged to the flask under agitation were the following: 7.4 g cyclohexanone; 22 g carbitol; 4.2 g butyl carbitol; 4.2 g butyl cellosolve; and 4.2 g butanol. The mixture was then heated under a $N_2$ blanket to 95° C. While at this temperature, 116.8 g of DYNAPOL L952 was added over a 10-minute period. The mixture was held at increasing temperatures until the DYNAPOL L952 was fully dissolved. This required increasing the temperature of the batch to 160° C. The increase was done over a period of 2 hours and 47 minutes. Once dissolved, the mixture was cooled to 78° C. and 4.3 g of dimethylethanolamine was added over 5 minutes. Once the addition was complete, 144.6 g of deionized water was added over a period of 60 minutes. Thirty minutes into the water addition, the heat was turned off and the temperature allowed to drop. A stable dispersion could not be achieved and the batch separated once agitation was stopped.

Preparative Example 19

Preparation of Aliphatic Polyester Dispersant

A round-bottom 3-liter flask fitted with a glycol column to remove the water of reaction was charged with the following: 694.8 g TCD Alcohol; 12.2 g MP DIOL; 61.8 g cyclohexanedimethanol—90%; 4.2 g trimethylol propane; 115.6 g isophthalic acid; 344.7 g terephthalic acid; 75.9 g sebacic acid; and 1.3 g tin oxalate as catalyst. The flask was fitted with a thermocouple, heating mantle, and $N_2$ flow. Under agitation, the mixture was heated to 240° C. while removing water during the heat up. The completion of this stage was monitored via acid number and considered complete when an acid number of 5.0 or less was achieved. Once the acid number was achieved, the batch was cooled to 170° C. and the column was replaced with a burrets trap filled with xylene. Xylene was added to the batch to reduce the solids to 94% and 72.5 g of maleic anhydride was then added to the batch. The batch was reheated to 190° C. while removing water and monitoring acid number and hydroxyl delta. The delta target was maintained at 16.0 and MP DIOL added as necessary. The reaction was continued until an acid number of 8.1 was determined. Once the acid number was achieved, the batch temperature was reduced to 160° C., and then 49.1 g of sorbic acid was added. The batch was held for 8 hours at 160° C. At the conclusion of the 8-hour hold, the batch was reduced to 64.5% solids with a mixture of cyclohexanone, carbitol, butyl carbitol, butylcellosolve, and butanol in a ratio of 17.4:52.6:10.0:10.0:10.0, respectively. The material produced had a Mn of 3060, and a solids of 64.5%.

Example 20

Evaluation of Water Dispersibility of Polyester Dispersant of Example 19

A sample of 193.8 g of material from Example 19 and 15.8 g of butyl cellosolve were charged to a 1-liter round-bottom flask fitted with thermocouple and condenser. Under agitation, the mixture was heated to 78° C. and 3.5 g of dimethylethanolamine was added over 5 minutes. Once the addition was complete, 217.9 g of water was added over a period of 60 minutes. Thirty minutes into the water addition, the heat was turned off and the temperature allowed to drop. At the conclusion of the water addition, the batch was cooled to room temperature to produce a stable dispersion with the following properties: NV=29.9%; pH=8.1; acid number=22.2; particle size=0.17 micron; and a viscosity=33.8 seconds.

Example 21

Preparation of Aqueous Dispersion with Polyester Dispersant of Example 18

A sample of 88.2 g of material from Example 19 was charged to a 1-liter round-bottom flask fitted with thermocouple and condenser. Also charged to the flask under agitation was 20.9 g butyl cellosolve. The mixture was then heated under a $N_2$ blanket to 85° C. While at this temperature, 56.9 g of DYNAPOL L912 was added over a 15 minute period. The mixture was held at this temperature for about 120 minutes until the DYNAPOL L912 was dissolved. Once dissolved, the mixture was cooled to 78° C. and 1.7 g of dimethylethanolamine was added over 5 minutes. Once the addition was complete, 104.0 g of water was added over a period of 60 minutes. Thirty minutes into the water addition, the heat was turned off and the temperature allowed to drop. At the conclusion of the water addition, the batch was cooled to room temperature to produce a stable dispersion with the following properties: NV=42.4%; pH=7.8; acid number=11.1; particle size=0.24 micron. The loading of DYNAPOL L912 on the polymeric surfactant of Example 19 was at 50% solids on solids.

TABLE 2

Properties of Dispersants

| Ex. No. | Hydrophobic Polyester | Dispersant | Dispersant Reactants | Dispersant Mol. Wt. (Daltons) | Dispersant Tg (° C.) | Dispersant Acid Number |
|---|---|---|---|---|---|---|
| 3 | DYNAPOL L952 | Ex. 1 (Aromatic) | Maleic Anhydride and Sorbic Acid | 5460 | 31 | 24.8 |
| 6 (Comp.) | EASTAR 6763 | Ex. 4 (Aromatic) | Maleic/Nadic Anhydrides and Sorbic Acid | 3820 | 77 | 27.2 |
| 9 | DYNAPOL L952 | Ex. 7 (Aromatic) | Maleic Anhydride and Trimellitic Anhydride | 3620 | 19 | 32.6 |
| 12 (Comp.) | DYNAPOL L952 | Ex. 10 (Aromatic) | Maleic Anhydride and Isophthalic Acid | 2980 | 14 | 25.7 |
| 15 (Comp.) | DYNAPOL L952 | Ex. 13 (Aliphatic) | Maleic Anhydride and Sorbic Acid | 5290 | <14 | 21.3 |
| 18 (Comp.) | DYNAPOL L952 | Ex. 16 (Aliphatic) | Maleic Anhydride and Trimellitic Anhydride | 3620 | <14 | 32.0 |
| 21 | DYNAPOL L912 | Ex. 19 (Aromatic) | Maleic Anhydride and Sorbic Acid | 3060 | 77 | 22.2 |

TABLE 3

Performance Paramaters of Dispersions

| Dispersion | Aqueous Stability |
|---|---|
| Example 3 | Stable |
| Comparative Example 6 | Fail |
| Example 9 | Stable |
| Comparative Example 12 | Fail |
| Comparative Example 15 | Fail |
| Comparative Example 18 | Fail |
| Example 21 | Stable |

The complete disclosures of the patents, patent documents, and publications cited herein are incorporated by reference in their entirety as if each were individually incorporated. To the extent that there is any conflict or discrepancy between this specification as written and the disclosure in any document that is incorporated by reference herein, this specification as written will control. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

What is claimed is:

1. An aqueous dispersion comprising:
water;
a hydrophobic aromatic polyester having a number average molecular weight of greater than 7,000 Daltons; and
a water-dispersible aromatic polyester dispersant;
wherein the hydrophobic aromatic polyester and the water-dispersible aromatic polyester dispersant form a stable aqueous dispersion; and
wherein the hydrophobic aromatic polyester is present in the aqueous dispersion in an amount of less than 50 wt-%, based on the total weight of the hydrophobic aromatic polyester and the water-dispersible aromatic polyester dispersant.

2. The aqueous dispersion of claim 1 comprising particles having a particle size of at least 0.1 micron and up to 0.4 micron.

3. The aqueous dispersion of claim 1 comprising the hydrophobic aromatic polyester in an amount of at least 10 wt-%, based on the total weight of the hydrophobic aromatic polyester and the water-dispersible aromatic polyester dispersant.

4. The aqueous dispersion of claim 1 comprising polyester solids in an amount of at least 5 wt-% and up to 40 wt-%, based on total weight of the aqueous dispersion.

5. The aqueous dispersion of claim 1 wherein the hydrophobic aromatic polyester has a Tg of at least 50° C.

6. The aqueous dispersion of claim 1 wherein the hydrophobic aromatic polyester comprises at least 30 wt-% and up to 80 wt-% aromatic groups.

7. The aqueous dispersion of claim 1 wherein the water-dispersible aromatic polyester dispersant comprises at least 20 wt-% and up to 70 wt-% aromatic groups.

8. The aqueous dispersion of claim 1 wherein the water-dispersible aromatic polyester dispersant has an acid number of at least 5, and no greater than 200, mg KOH per gram resin.

9. The aqueous dispersion of claim 1 wherein the water-dispersible aromatic polyester dispersant has a Tg of at least 0° C.

10. The aqueous dispersion of claim 1 wherein the water-dispersible aromatic polyester dispersant comprises a backbone and an end group and/or side group that includes at least one salt group.

11. The aqueous dispersion of claim 10 wherein the water-dispersible aromatic polyester dispersant comprises:
a backbone; and
an end group that includes at least one salt group, wherein the end group comprises the reaction product of a compound having at least one hydroxyl reactive group and at least one carboxylic acid group with the terminal OH groups of an aromatic polyester.

12. The aqueous dispersion of claim 10 wherein the water-dispersible aromatic polyester dispersant comprises:
a backbone; and
a side group that includes at least one salt group, wherein the side group comprises the reaction product of an unsaturated compound having at least one salt or salt-forming group that is attached to another portion of the polymer via reaction of the unsaturated compound with one or more double or triple bonds, with the proviso that the reaction of the unsaturated compound with the one or more double or triple bonds does not require the participation of a free-radical initiator.

13. The aqueous dispersion of claim 10 wherein the at least one salt group comprises a neutralized acid or anhydride group.

14. The aqueous dispersion of claim 1 having a viscosity suitable for spray coating.

15. The aqueous dispersion of claim 1 which is stable for at least 3 months under storage conditions of room temperature and atmospheric pressure without agitation.

16. An article comprising:
one or more of a body portion or an end portion of a food or beverage can comprising a metal substrate; and
a coating disposed on at least a portion of the metal substrate, the coating formed from an aqueous dispersion of claim 1.

17. The article of claim 16 wherein the article comprises a beverage can, the coating is a continuous inside spray coating.

18. A method of making an aqueous dispersion, the method comprising:
providing a hydrophobic aromatic polyester having a number average molecular weight of greater than 7,000 Daltons;
providing a water-dispersible aromatic polyester dispersant; and
mixing the hydrophobic aromatic polyester and the water-dispersible aromatic polyester in water under conditions effective to form a stable aqueous dispersion;
wherein the conditions effective to form a stable aqueous dispersion comprises a temperature of 100° C. to 120° C. and atmospheric pressure.

19. A method of using an aqueous dispersion, the method comprising:
providing an aqueous dispersion of claim 1; and
applying the aqueous dispersion to at least a portion of a metal substrate prior to or after forming the metal substrate into a food or beverage can or portion thereof.

20. The method of claim 19 wherein applying the aqueous dispersion comprises spraying the aqueous dispersion on the metal substrate in an amount sufficient to form a cured coating having an average dry film weight of 1.55 g/m² to 31 g/m².

* * * * *